F. J. TILLMAN.
CALCULATING ATTACHMENT FOR TYPEWRITING MACHINES.
APPLICATION FILED MAR. 12, 1917.
1,379,322.
Patented May 24, 1921.
14 SHEETS—SHEET 4.
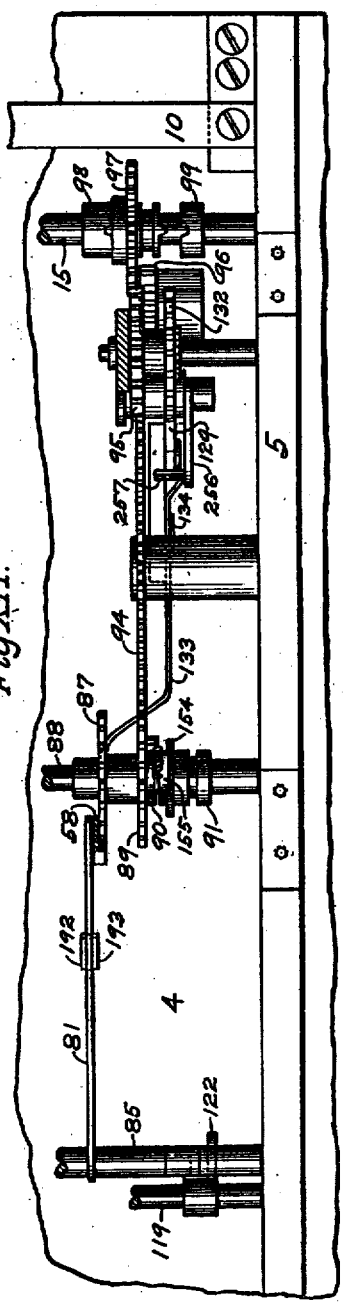
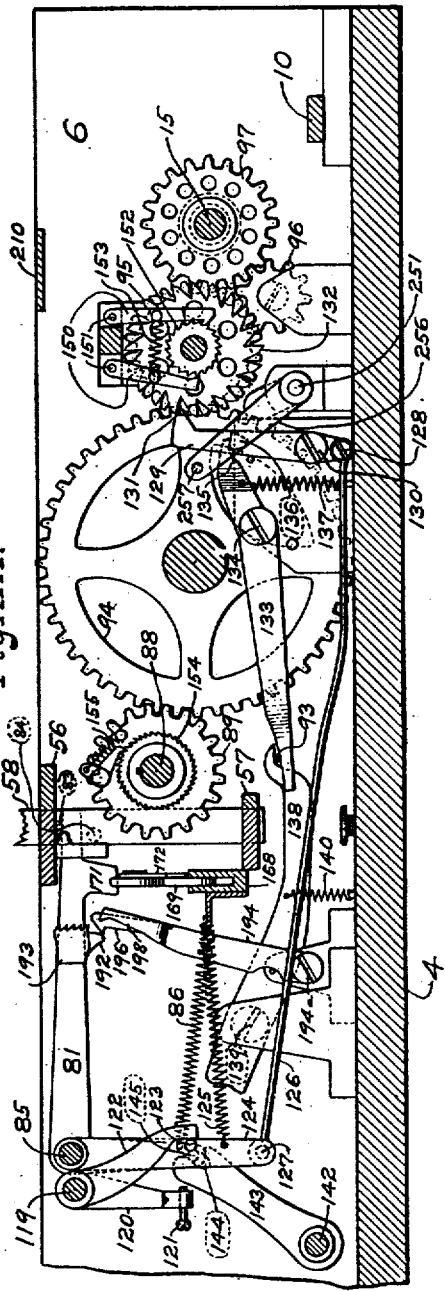
Inventor:
F. J. Tillman
By Knight Cook attys

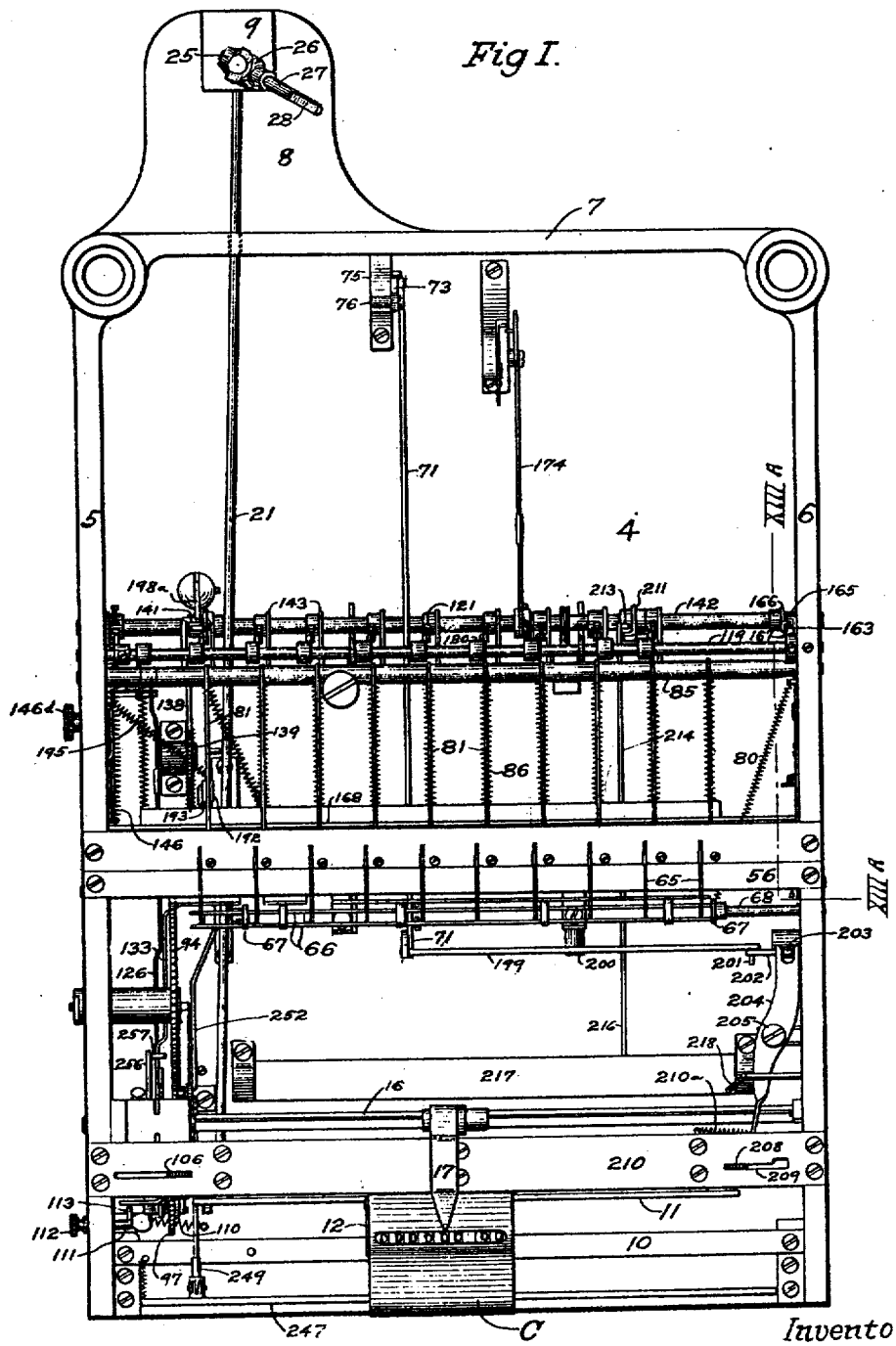

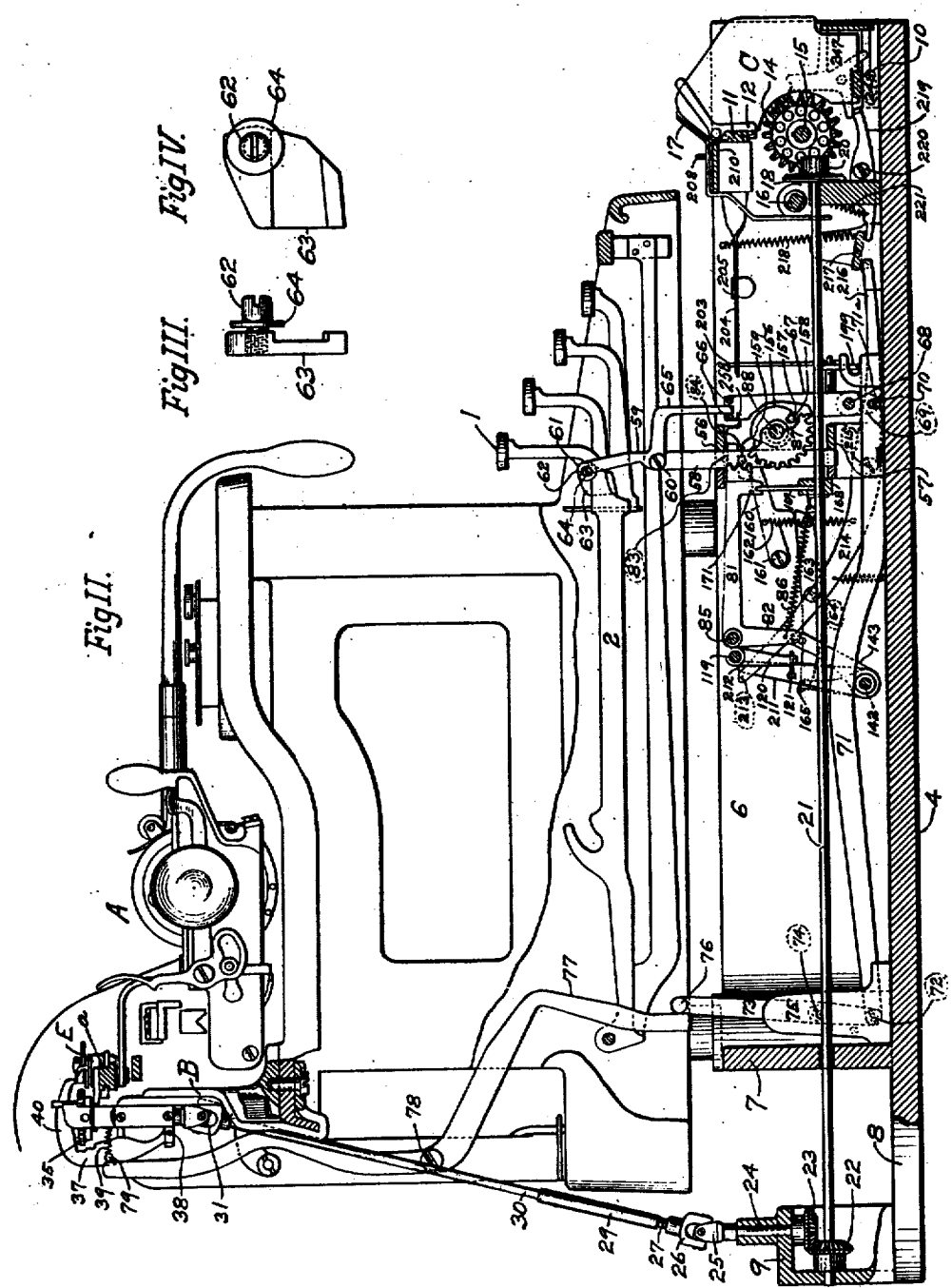

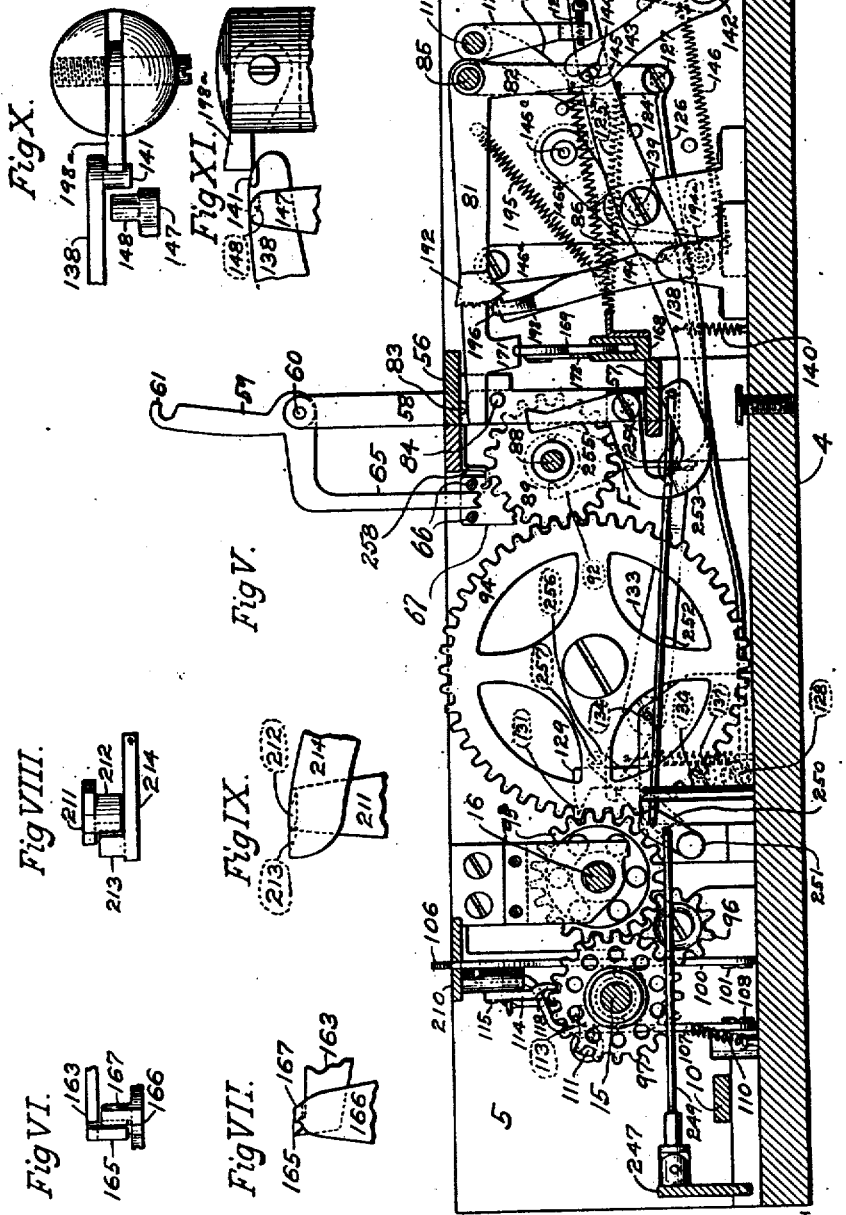

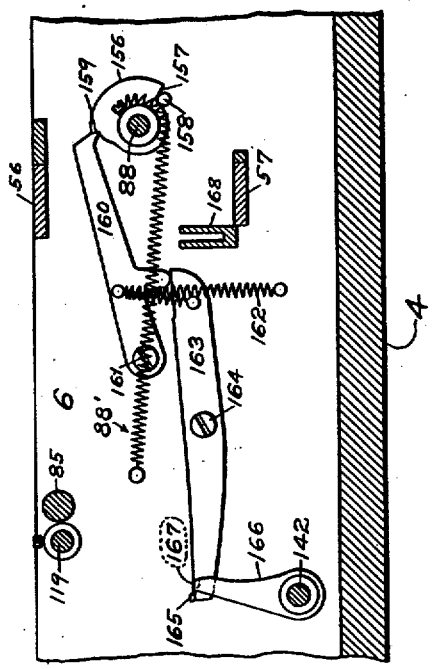

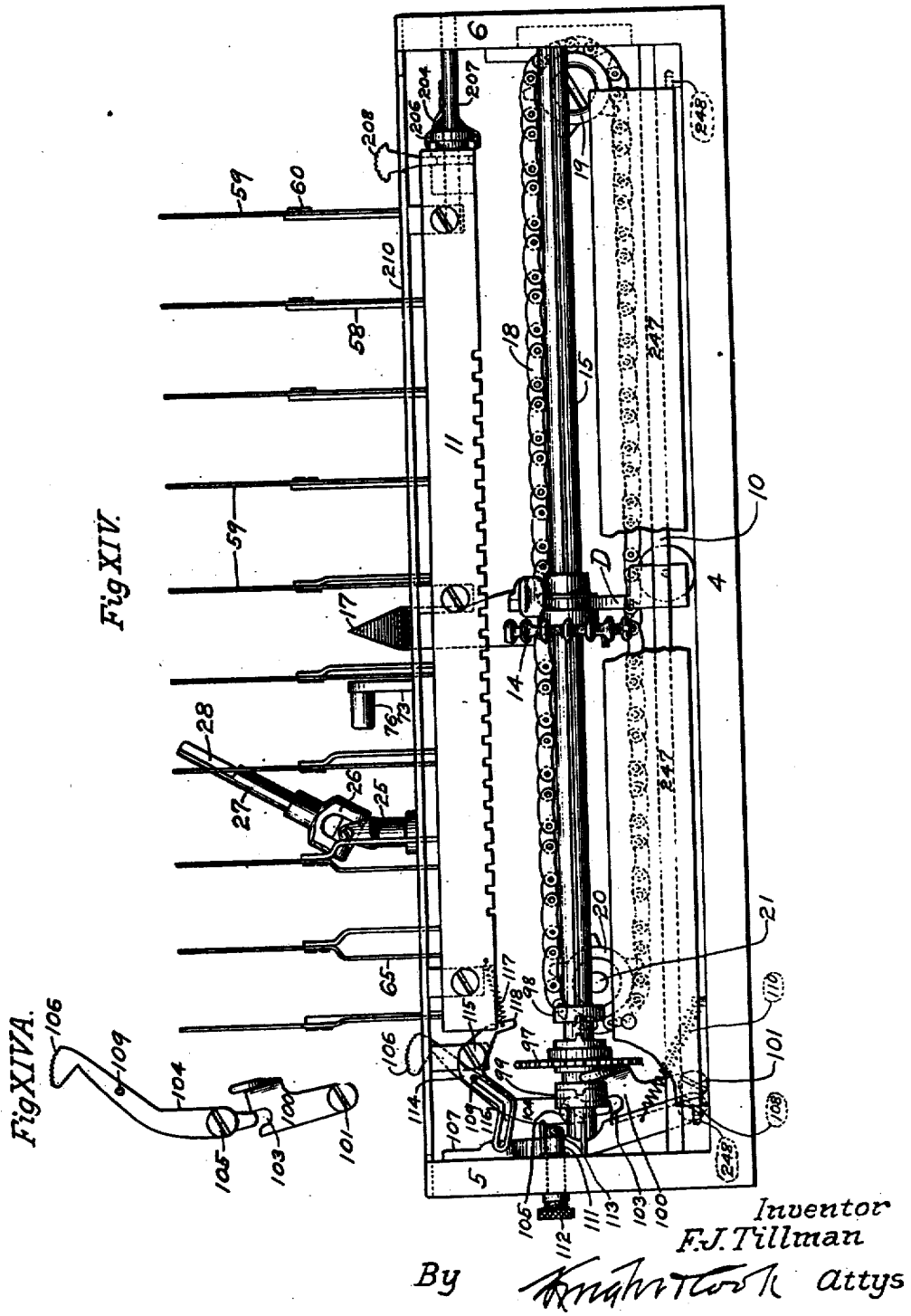

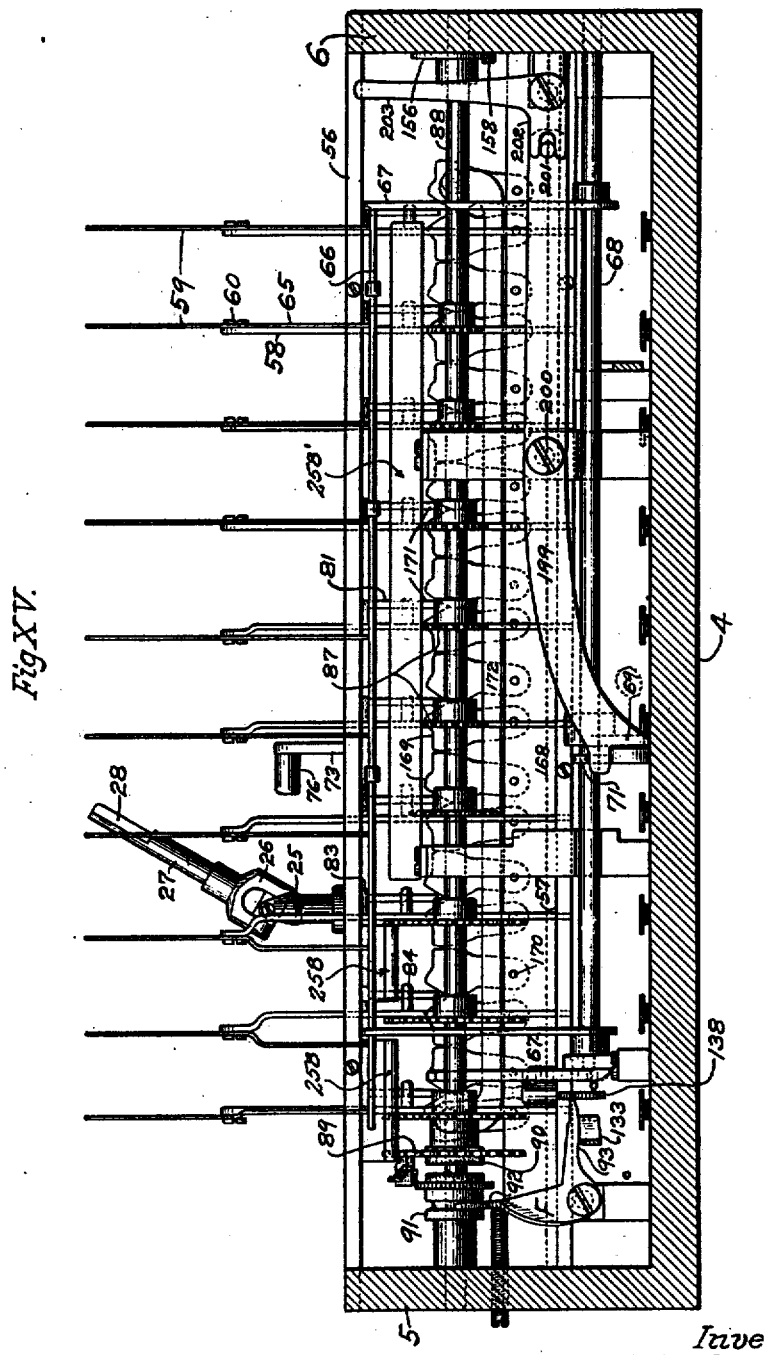

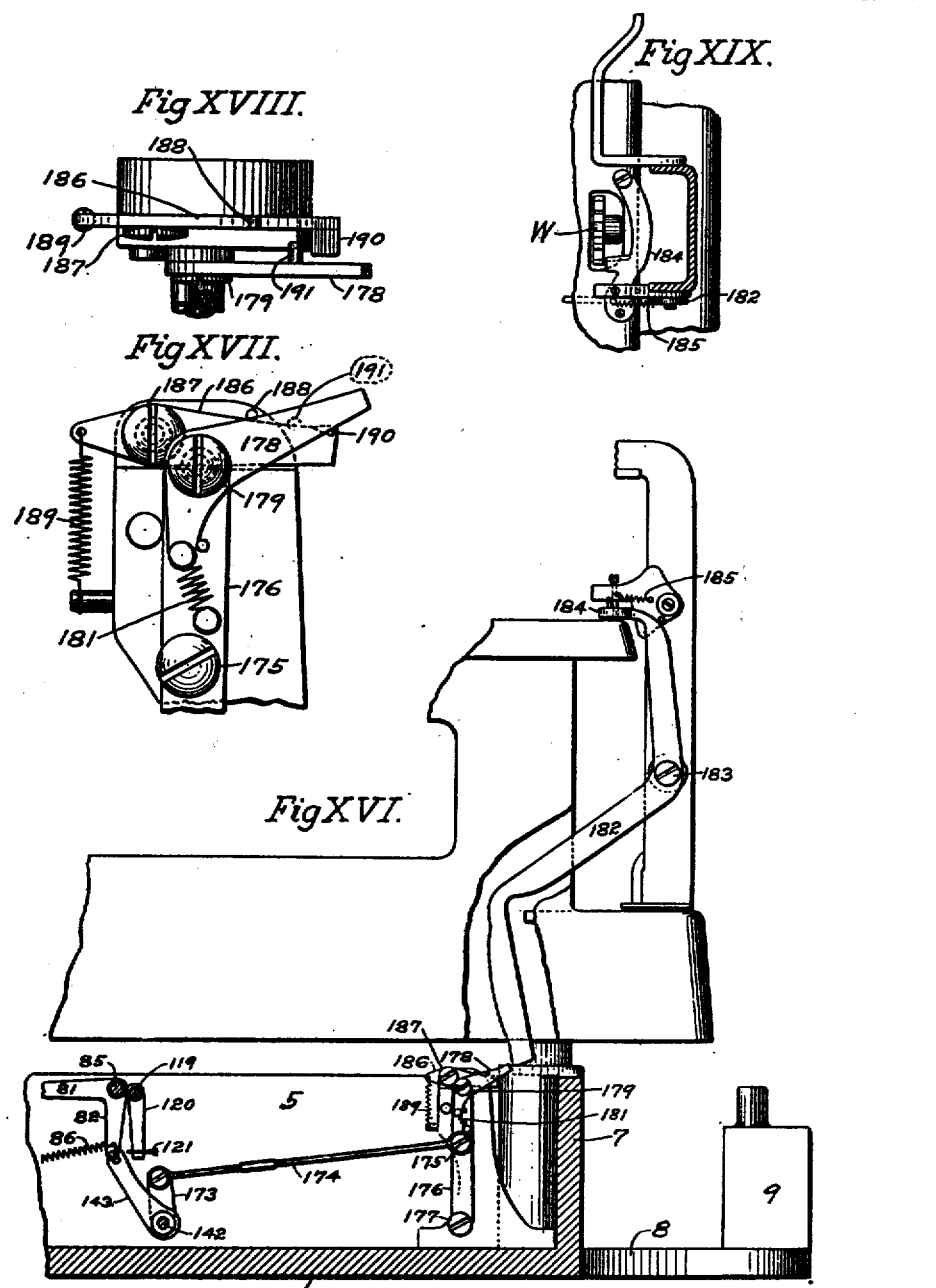

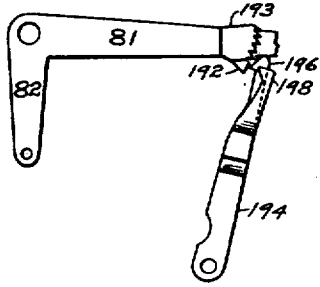
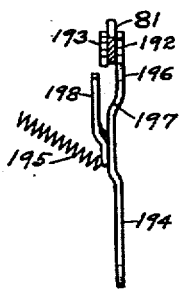
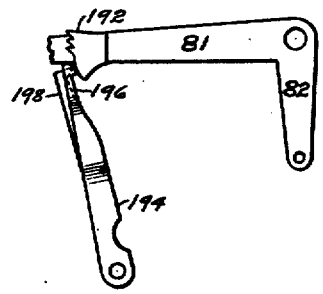
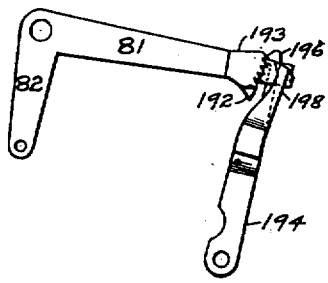
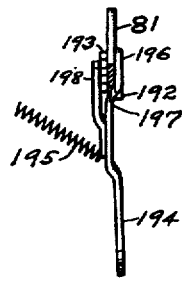
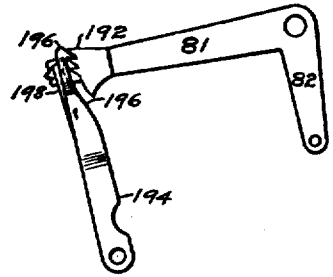
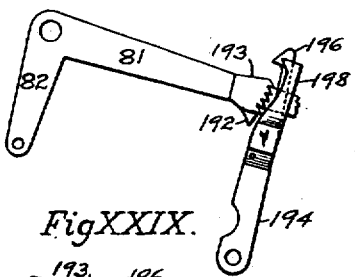
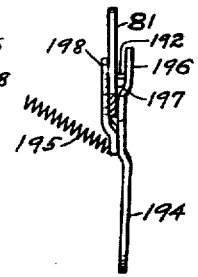
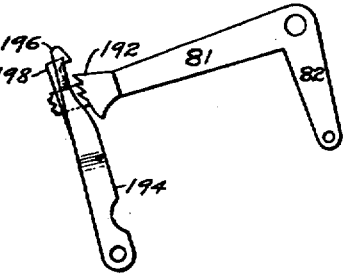
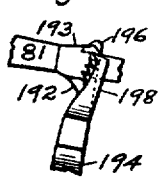

F. J. TILLMAN.
CALCULATING ATTACHMENT FOR TYPEWRITING MACHINES.
APPLICATION FILED MAR. 12, 1917.
1,379,322.
Patented May 24, 1921.
14 SHEETS—SHEET 10.
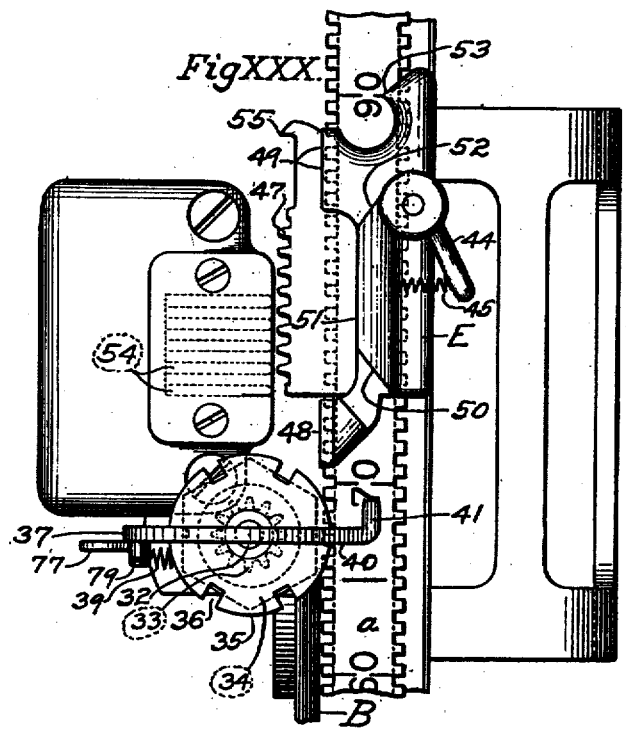
Fig XXX.
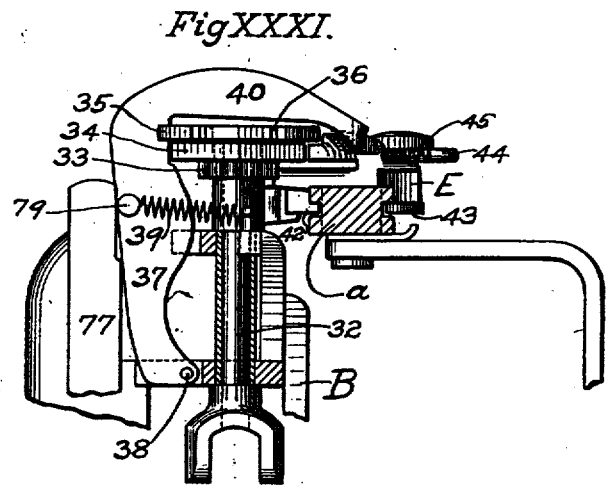
Fig XXXI.
Inventor
F. J. Tillman
By Knight & Cook
attys

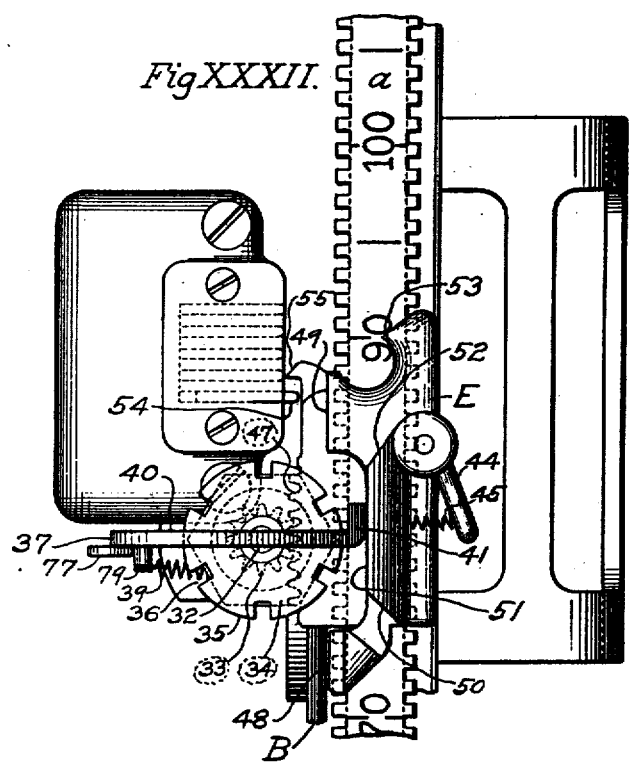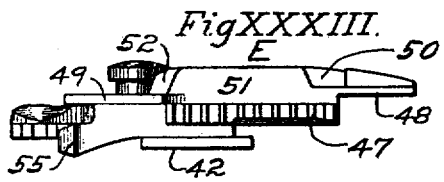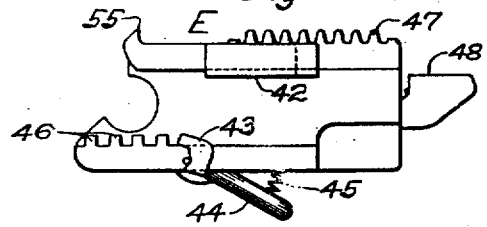

F. J. TILLMAN.
CALCULATING ATTACHMENT FOR TYPEWRITING MACHINES.
APPLICATION FILED MAR. 12, 1917.
1,379,322.
Patented May 24, 1921.
14 SHEETS—SHEET 12.
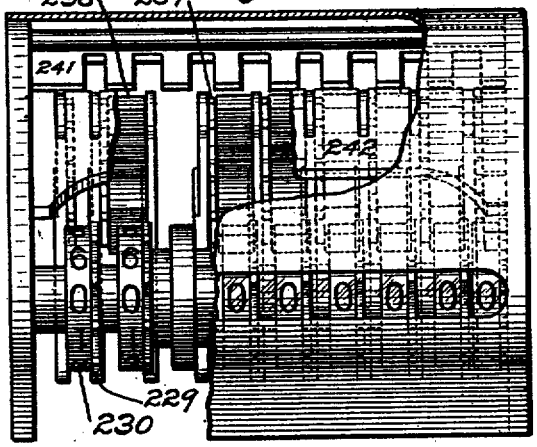
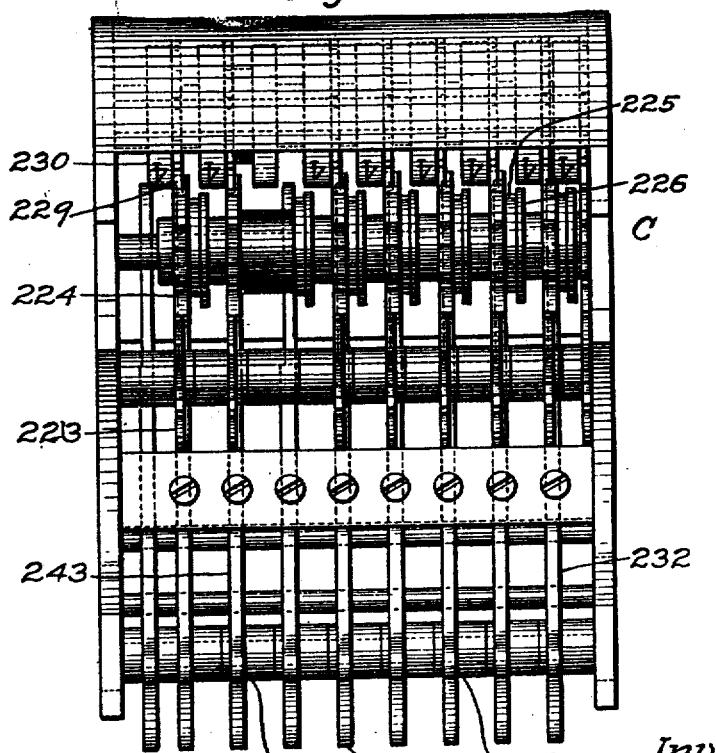
Inventor
F. J. Tillman
By Knight & Cook
attys

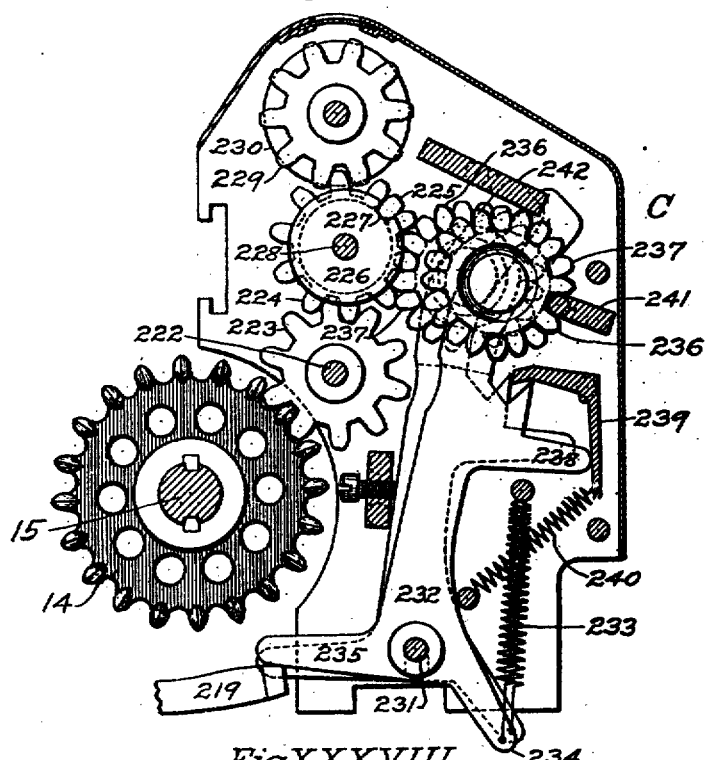
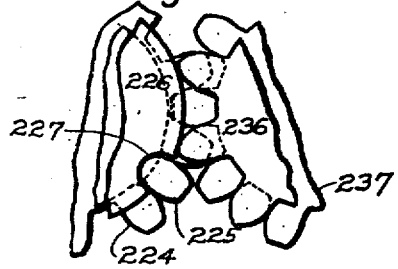
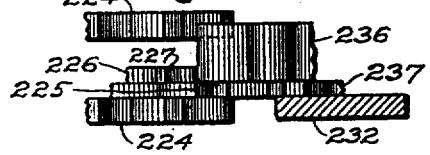

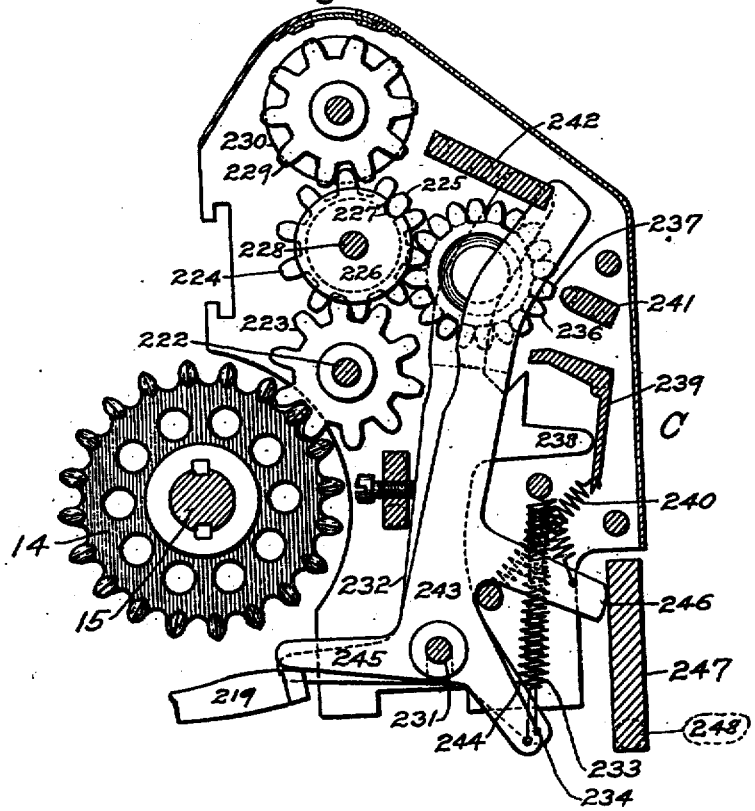
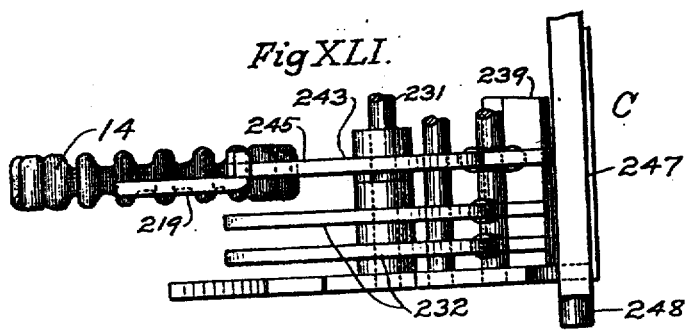

UNITED STATES PATENT OFFICE.

FERDINAND J. TILLMAN, OF ST. LOUIS, MISSOURI, ASSIGNOR TO TYPEWRITER CALCULATING ATTACHMENT COMPANY, A CORPORATION OF MISSOURI.

CALCULATING ATTACHMENT FOR TYPEWRITING-MACHINES.

1,379,322.

Specification of Letters Patent. Patented May 24, 1921.

Application filed March 12, 1917. Serial No. 154,196.

*To all whom it may concern:*

Be it known that I, FERDINAND J. TILLMAN, a citizen of the United States of America, a resident of the city of St. Louis, State of Missouri, have invented certain new and useful Improvements in Calculating Attachments for Typewriting-Machines, of which the following is a full, clear, and exact description, reference being had to the accompanying drawings, forming a part of this specification.

My present invention relates to a calculating attachment or machine for use with a typewriting machine of ordinary construction, in which there is a platen carriage and numeral key levers, the attachment being of the type shown and described in Letters Patent of the United States No. 1,003,671 issued to me September 19, 1911, and upon which the present invention is somewhat in the nature of an improvement.

Figure I is a top or plan view of my calculating machine except for the parts carried by the typewriting machine, which is omitted from this view.

Fig. II is a vertical longitudinal section through the calculating machine and a typewriting machine resting thereon in position for coöperation therewith.

Fig. III is an edge view of one of the clips attached to the numeral key levers of the typewriting machine to receive the connectors in the calculating machine.

Fig. IV is a side view of the clip shown in Fig. III.

Fig. V is an enlarged longitudinal section through the forward portion of the calculating machine on a line adjacent to a train of gearing leading from the mechanism directly operable by the numeral key levers of the typewriting machine to the registering mechanism.

Figs. VI to IX, inclusive, are detail views of coöperable cam members in the machine.

Figs. X and XI are respectively top and side views illustrating means for preventing operation of the integer "1" key lever of the typewriting machine under a certain condition.

Fig. XII is a top or plan view of the gearing shown in Fig. V.

Fig. XIII is a longitudinal section through the machine taken on a line at the opposite side of the parts shown in Fig. V.

Fig. XIII$^A$ is a section on line XIII$^A$—XIII$^A$, Fig. I.

Fig. XIV is a front elevation of the calculating machine, the accumulator being omitted.

Fig. XIV$^A$ is a detail view of the shifter operating members used in changing from one description of calculation to another.

Fig. XV is a vertical transverse section through the calculating machine at a point immediately in front of the integer wheel shaft and the means for operating this shaft, which are under control of the numeral key levers of the typewriting machine.

Fig. XVI is an elevation partly in section illustrating means for preventing movement of the platen carriage of the typewriting machine during operation of the calculating mechanism.

Fig. XVII is an enlarged side elevation of the elements in the mechanism shown in Fig. XVI, supported by the calculating machine.

Fig. XVIII is a top view of the parts shown in Fig. XVII.

Fig. XIX is a plan view, partly in section, of the platen carriage escapement device of the typewriting machine and the means directly associated therewith for locking said escapement.

Figs. XX to XXIX, inclusive, are diagrams illustrating the means for necessitating full stroke movement of the integer "1" key lever of the typewriting machine.

Fig. XXX is a plan view of the feeder on the platen carriage of the typewriting machine and the mechanism coöperable therewith.

Fig. XXXI is a side elevation, partly in section, of the parts shown in Fig. XXX.

Fig. XXXII is a view similar to Fig. XXX with the coöperating parts shown in the positions assumed during the movement of the typewriting machine carriage and the feeder carried thereby.

Fig. XXXIII is an edge view of the feeder shown in Figs. XXX to XXXII, inclusive.

Fig. XXXIV is a bottom view of the feeder.

Fig. XXXV is an enlarged plan view, partly broken out, of the accumulator.

Fig. XXXVI is an enlarged rear elevation of the accumulator.

Fig. XXXVII is an enlarged vertical cross section through the accumulator.

Fig. XXXVIII is an enlarged view of portions of one of the secondary transmission wheels in the accumulator and one of the controlling wheels.

Fig. XXXIX is a bottom view of the parts shown in Fig. XXXVIII.

Fig. XL is a vertical cross section through the accumulator at the decimal column.

Fig. XLI is a bottom view of a portion of the accumulator adjacent to a decimal column.

My calculating machine is one intended to be operated through the medium of the numeral key levers of a typewriting machine, which typewriting machine may be one of any of a variety of such machines at present upon the market, in which there is a platen carriage and numeral key levers as well as letter and other character key levers. The typewriting machine shown in the accompanying drawings (Fig. II) has a common form of keyboard, including numeral keys 1 carried by spring supported key levers 2, pivotally mounted at their rear ends. A designates the platen carriage of the typewriting machine, which includes a rack bar $a$ that extends longitudinally of the carriage and transversely of the typewriting machine. The said rack bar is grooved longitudinally at the front and rear edges, and is provided with front and rear teeth, (see Figs. XXX to XXXII) the teeth at one edge of the rack bar, for example the front, being the only ones with which the present invention is concerned.

The typewriting machine is mounted upon a frame which constitutes the frame of my calculating machine and which comprises a base 4, side walls 5 and 6 and a rear member 7. At the rear end of said frame is an extension 8 surmounted by a post 9.

The registering mechanism is located at the front of the machine and comprises an accumulator C adjustable from one position to another transversely of the machine. The accumulator is seated upon a transverse supporting bar 10 and is fitted to a vertically disposed transverse bar 11 provided with teeth with which a latch 12 carried by the totalizer engages to hold said totalizer in a positive position after it has been set at any point along the bar 11. The accumulator may be of any suitable type containing numeral wheels and transmission wheels by which the numeral wheels are operated, but is preferably of the type and construction hereinafter described. It is well to here mention that there may be any desired number of transmission wheels in the accumulator and a similar number of numeral wheels operable by said transmission wheels, and that the number of the transmission wheels may or may not correspond to the number of numeral key levers 2 in the typewriting machine used in conjunction with my calculating machine.

The transmission wheels of the accumulator C are operated by a master wheel 14 splined to a transverse shaft 15 journaled in the side walls 5 and 6, said master wheel being movable along said shaft and into engagement with the transmission wheels of the accumulator, irrespective of the point at which said accumulator is located transversely of the machine.

I will next describe means whereby the accumulator actuating master wheel 14 of my calculating machine is caused to move along the shaft 15 in response to movement of the platen carriage of the typewriting machine. The master wheel 14 is fitted to a carriage D (see Fig. XIV) slidable upon a guide rod 16 located at the rear of the shaft 15, said carriage D being provided with an index finger 17 extending forwardly into proximity with the numeral wheels of the accumulator. An endless chain 18, extending transversely of the machine, is attached to the carriage D, and is operable at one side of the machine upon an idler wheel 19. At the opposite side of the machine said endless chain is fitted to a drive wheel 20 fixed to a rearwardly extending drive shaft 21. The shaft 21 terminates at the post 9 and has fixed to it a bevel pinion 22 which meshes with a bevel pinion 23 fixed to a vertical shaft 24 mounted in the post 9, (see Fig. II). The shaft 24 is provided with one member 25 of a universal joint to which is fitted the second member 26 of said joint, the latter being provided with a stub shaft 27 having a non-circular portion 28 (see Fig. XV). The stub shaft 27 receives a slidable connection sleeve 29 which serves to hold a shaft 30 in engagement with the stub shaft 27, the said shaft 30 having a non-circular portion slidably fitted to the non-circular portion 28 of said stub shaft, in order that the shaft 30 may partake of a limited endwise movement and remain coöperable with said stub shaft. The shaft 30 leads upwardly to a point back of the typewriting machine carriage A, and is connected by universal joint 31 to a transmission shaft 32 vertically positioned in a frame B supported in juxtaposition to the typewriting machine carriage rack bar $a$.

The transmission shaft 32 carries a pinion 33, a polygonal disk 34 and a lock disk 35, these parts being most clearly shown in Figs. XXX to XXXII and being all horizontally arranged one above the other in the order named, and being all fixed to said transmission shaft. The lock disk 35 is provided with a plurality of vertical notches 36 corresponding in number to the number of flat faces on the disk 34. 37 is a locking dog pivoted at 38 to the frame B supporting the transmission shaft 32. This locking dog is vertically disposed and is adapted to enter any of the notches 36 in the locking disk 35 and be held therein by a pull spring 39. The locking dog 37 has a forwardly extending arm 40 which juts forwardly over the locking disk 35 to a point above the carriage rack bar a, the dog terminating at its front end in an angular lip 41, the function of which to be hereinafter specified.

E designates a feeder (see Figs. XXX to XXXIV), adjustably mounted on the carriage rack bar a of the typewriting machine, this feeder serving as a medium to shift the master wheel 14 along the shaft 15 by operating the described mechanism leading to and including the transmission shaft 32. Said feeder E also serves to control the operation of said transmission shaft, as will appear from the following description. The feeder E extends longitudinally of the typewriting machine carriage rack bar a and the flanges of the feeder fit against the front and rear faces of the rack bar a above the longitudinal edge grooves therein, and one of said flanges is provided with a lip 42 which enters one of the grooves in the rack bar to hold that side of the feeder from upward movement. The opposite side of the feeder is held from upward movement by a latch finger 43 carried by a vertical rod rockably mounted in the feeder and provided with a finger piece 44 subject to the action of a spring 45 which tends to hold the latch finger 43 in the groove in the carriage rack bar opposite to that in which the lip 42 seats. Teeth 46 (see Fig. XXXIV) projecting from the inner face of one of the flanges of the feeder E engage teeth on the rack bar a and restrain the feeder against longitudinal movement relative to said rack bar, so that the feeder is required to partake of whatever movement is partaken of by the platen carriage of the typewriting machine. At the rear edge of the feeder E is a rack 47 which is coöperable with the pinion 33 on the transmission shaft 32 and through the medium of which said transmission shaft is rotated while said parts are in engagement with each other. It will be understood from the foregoing that the feeder E may be held stationary on the carriage rack bar a and that when its rack 47 engages the pinion 33 the transmission shaft 32 will be rotated and in turn act to rotate the shafts 30 and 21, and operate the endless chain 18 to carry the master wheel 14 along the shaft 15. The feeder E is provided at its rear edge and adjacent its ends with flat rear faces 48 and 49 which are adapted to ride in contact with one of the flat faces of the polygonal disk 34 to prevent rotation of the transmission shaft 32 just previous to the release of the locking dog 37 from the notched disk 35, and also just previous to the reëngagement of said locking dog. Upon the feeder E is a vertical inclined cam 50 which leads to a vertical flat runway 51 parallel with the rack bar a, and at the opposite end of said runway is a vertical inclined cam 52. When the carriage of the typewriting machine is advanced step by step during the operation of the machine, the flat face 48 on the feeder E first comes into contact with one of the flat faces on the polygonal disk 34, and remains in contact therewith until the angular lip 41 on the locking dog 37 has moved along the inclined cam 50 and passed onto the flat runway face 51 of the feeder E. During the period that the lip 41 of the locking dog is traveling along the flat face 51, the latch dog is held out of engagement with the notched disk 35, and the rack 47, having engaged the pinion 33 on the transmission shaft immediately following the separation of the flat face 48 from the polygonal disk 34, said rack is permitted to rotate the transmission shaft 32 until the last rack tooth has become separated from said pinion and the flat face 49 of the feeder E comes into contact with one of the flat faces of the polygonal disk to again hold it from rotation, with one of the notches in the disk 35 in position to receive the locking dog 40. Coincident with the approach of the flat face 49 to the polygonal disk 34 the lip 41 of the locking dog reaches and rides forwardly along the inclined cam 52, and said dog is permitted to enter the notch in the disk 35.

The feeder E is adapted to be adjusted to any desired point along the carriage rack bar a according to that corresponding to the point at which a calculation is to be written upon a sheet of paper placed in the platen carriage, and, to assist the operator in localizing the feeder, I provide a scale on the platen carriage rack bar a and a pointer 53 on the feeder.

The feeder E is coöperable with the tabulating device of a typewriting machine comprising stop pins 54 (see Figs. XXX and XXXII), and key lever actuated mechanism for advancing said stop pins into the path of movement of a tooth 55 carried by the feeder. When a tabulating key of the typewriting machine, for example either the tens, hundredths or thousandths key, is operated, the stop pin 54 corresponding thereto is projected into the path of movement of the tooth 55, and the step by step movement of the feeder E and the typewriting machine carriage is arrested when the parts 55 and 54 become engaged with each other.

I will now proceed to a description of the portion of the calculating mechanism having connection with the numeral key levers of the typewriting machine (see Figs. II and V). 56 and 57 designate upper and lower guide bars extending transversely of my calculating machine beneath the numeral key levers 2. 58 are toothed slide bars operable in a vertical direction in said guide bars. There are nine of the bars 58 arranged in a row transversely of the calculating mechanism according to the integers 1 to 9, the integer "1" bar 58 having one tooth, the integer "2" bar having two teeth, and so on throughout the entire series. Said toothed slide bars are movable into engagement with integer wheels, as will be hereinafter more particularly described. Each toothed bar 58 is detachably connected to the numeral key lever 2 of corresponding denomination by a connector 59 pivoted to the slide bar at 60 and having a hook 61 at its upper end which is open at its rear edge. Each hook 61 is adapted to engage a screw stud 62 forming part of a clip secured to a numeral key lever. The said clip consists, aside from said screw stud, of a grooved plate 63 fitted to the numeral key lever and held thereto by a washer 64 on the screw stud. The connectors 59 are intended to be in engagement with the numeral key levers of the typewriting machine only during calculating operations, and it is well to, at this point, describe the mechanism whereby said connectors are thrown into and out of engagement with the numeral key levers. Each connector 59 is provided with a pendant tail piece 65 operable between a pair of parallel rods 66 extending transversely of the calculating machine in front of the guide bar 56. These rods are mounted in supporting arms 67 fixed to a rock shaft 68. The rock shaft 68 has fixed to it an arm 69 (see Fig. II) provided with a laterally projecting pin 70 which receives a notch extending upwardly from the bottom of a shifter bar 71, which leads rearwardly from said rock shaft, and the rear end of which is pivoted at 72 to a rocker 73 pivotally connected at 74 to a post 75 on the base of the calculating machine. The rocker 73 is provided at its upper end with a stud 76. 77 is a shift lever pivotally connected to the rear portion of the typewriting machine at 78 and having its lower end arranged in contact with the stud 76 of the rocker 73. The upper end of the lever 77 is located immediately back of a stud 79 carried by the locking dog 37. In consequence of the positioning of the upper end of the shift lever 77, as just stated, said lever is actuated when the locking dog is thrown rearwardly out of engagement with the notched disk 35 during movement of the typewriting machine platen carriage, and the lower end of the lever 77 is moved forwardly with the result of imparting a forward movement to the upper end of the lever 73. As a consequence, the shift bar 71 is drawn rearwardly, the rock shaft 68 is rotated to throw the arms 67 carried thereby in a forward direction, and the tail pieces of the connectors 59, situated between the rods 66 are moved to throw the hooks of the connectors, which have been previously separated from the stud 62 carried by the numeral key levers 2, into engagement with said studs, in which position they are seen in Fig. II, and which position they retain until the locking dog 37 has again moved forwardly when permitted to do so. When the last mentioned action has taken place the connectors are detached from the numeral key levers, due to rearward movement of the rods 66 and the arms 67 by which they are carried, such movement being occasioned by a pull spring 80.

The toothed slide bars 58 by which the integer wheels of the calculating mechanism are operated are normally held in elevated position and returned to elevated positions after downward movement by bell crank levers comprising horizontal arms 81 and vertical arms 82. The forward ends of the lever arms 81 are positioned between upper and lower studs 83 and 84. The bell cranks comprising the lever arms 81 and 82 are loosely mounted on a transverse rod 85 seated in the side walls of the calculating machine frame back of the toothed slide bars 58. Springs 86 connecting the arms 82 to a fixed part of the calculating machine serve to normally hold the arms 81 in an uplifted position, and the arms 82 in a forward position.

Having now described the parts of the calculating mechanism most directly associated with the numeral key levers of the typewriting machine, I will proceed to the portion of the calculating mechanism operated by the toothed bars 58. 87 designates integer wheels fixed to a transverse shaft 88 located in front of the series of toothed slide bars 58, (see Figs. II, XII and XV). There is an individual wheel 87 for each toothed slide bar 58 which said bar is adapted to engage, and each toothed slide bar has a number of teeth thereon corresponding to the integer of the typewriting machine numeral key lever by which it is operated, the said teeth being so disposed on the bars which carry them that they will engage the corresponding integer wheel 87 and rotate it and the shaft 88 a distance proportionate to the size of the integer. The integer wheels are preferably of different diameters and different pitch, but the result of the degree of operation of them by the toothed slide bars 58 is not affected by this, the purpose in making such wheels of different diameter and pitch being solely to provide a more uniform key pressure in the typewriting machine. The teeth of the toothed slide bars 58 of the higher denominations, for instance those operated by the 8 and 9 numeral key levers 2, engage small integer wheels, and such engagement takes place approximately at the beginning of the downward stroke of the toothed bars, while the toothed bars of the lower denominations are considerably separated from the integer wheels when at rest, and their teeth do not mesh with the integer wheels until the downward strokes of the toothed bars is nearly completed. Therefore, by using integer wheels of different diameters and pitches, i. e., a small wheel for a large integer and a large wheel for a small integer, the strokes of the actuating keys connected to the toothed bars 58 are rendered more uniform than they would be if the integer wheels were not made as described.

89 designates a gear wheel loosely mounted on the shaft 88 near one side of the calculating machine, said wheel being provided with a clutch member 90 adapted to be engaged by a clutch collar 91 (see Fig. XV) splined to the shaft 88 and movable into engagement with the clutch member 90 to provide for the driving of the spur wheel 89 during the operation of the integer wheels 87. The clutch collar 91 is operable by a shifter F comprising a fork 92 fitted to the collar, and a lever arm 93 operable by means to be hereinafter described, whereby the wheel 89 is made to rotate with the shaft 88 at the proper time. The spur wheel 89 is constantly in mesh with a transmission wheel 94 in front of it, and said transmission wheel meshes in turn with a gear wheel 95. The last mentioned wheel meshes with a pinion 96 and is adapted to be engaged by a gear wheel 97 splined to the registering mechanism shaft 15 on which the master wheel 14 is located. The wheel 97 is shiftable into mesh with either the pinion 96 or the gear wheel 95. When calculations involving addition are being performed said wheel 97 meshes with the pinion 96, so that the gear wheel 95 first drives the pinion 96 and the latter drives the wheel 97 to impart rotation to the shaft 15 and the master wheel 14. For subtraction calculation, the spur wheel 97 is shifted on the shaft 15 so that it will mesh directly with the spur wheel 95, whereby the shaft 15 and the master wheel are rotated reversely relative to the direction of movement when adding. The accumulator of my calculating attachment is one involving elements which may be operated in one direction for calculations involving addition and in the opposite direction for calculations involving subtraction, the master wheel 14 being operated either forwardly or reversely according to whether addition or subtraction is to be performed. The construction of the accumulator and its operation, to be hereinafter set forth, is such that it is believed its operation in the manner here stated will be plainly understood.

The gear wheel 97 being splined to the shaft 15 is required to rotate therewith, but to avoid play of said wheel upon said shaft I fix to the shaft at one side of the wheel a clutch collar 98, (see Fig. XIV) and at the opposite side of the wheel a clutch collar 99 adapted to interlock the hub of the gear wheel 97.

The gear wheel 97 is under the control of shifting and locking parts to be next described. 100 designates a shifting fork pivoted at 101 and fitted in a groove in the hub of the gear wheel 97. This fork is provided with a socket 103 which receives the lower end of a lever 104 pivoted at 105. The last mentioned lever is provided at its upper end with a finger piece 106 adapted to be engaged by the operator to move the lever 104 either to the right or left to throw the shifter fork 100 in a contrary direction. When the lever 104 is moved to the right the shifter fork carries the gear wheel 97 to the left and into mesh with the pinion 96, this being the position for addition. Movement of the lever 104 to the right operates the shifter fork to place the gear wheels 95 and 97 in mesh for subtraction. Considering the fact that the calculating mechanism is used most extensively for addition I provide means by which the lever 104 will normally be retained in a right hand position, or in other words, the position required for the engagement of the gear wheel 97 with the pinion 96. This means comprises a presser arm 107 pivoted at 108. This presser arm is located at the left of a pin 109 fixed to the lever 104, and has connected to it a pull spring 110 by which the arm may be drawn to the right and caused to hold the lever 104 in the extreme right hand position.

The presser arm 107 may, however, be thrown out of service and held in an inactive position. The means provided for this purpose comprises a latch rod 111 rockably mounted in the wall 5 of the calculating machine frame, said rod being provided at its outer end with a knob 112 and at its inner end with a transverse pin 113 adapted to be so turned that it will extend across the presser arm 107 and hold it retracted (as seen in Fig. XIV). When the presser arm 107 is out of operation the lever 104 by which the shifter fork 100 is controlled is held in either the right hand or left hand position through the medium of a bar 114 pivoted to the frame of the machine at 115. Said bar has a V-shaped cam slot 116 therein, in which the pin 109 carried by the lever 104 is operable. The bar 114 is connected to the frame of the machine by a spring 117 which tends to move the slotted bar 114 downwardly and, consequently, when the pin 109 is in either leg of the V-shaped slot 116 in said bar the lever 104 is held from accidental movement due to pressure of a wall of the cam slot 116 against the pin 109. Furthermore, when the pin 109 is thrown past the apex of said cam slot in either direction the spring 117 acts to so move the bar 114 as to cause the pin 109 to ride along the face of the cam slot 116 to an end of said slot, so that the lever 104 will be carried to the limit of its movement and be retained thereat. The bar 114 is provided at one end with a centering finger 118 which is adapted to become positioned between two adjacent teeth of the gear wheel 97 when said gear wheel is being shifted from adding to subtracting position, and vice versa.

Description will now be given of means whereby the transmission gears between the integer wheels and the registering mechanism are prevented from excessive rotation. 119 is a transverse rod located back of the rod 85 supporting the bell cranks having the lever arms 82 (see Figs. I, II, V, XII and XIII). This rod has fixed to it a series of downwardly extending arms 120 corresponding in number to the number of said bell cranks and in each of which is an adjustment screw 121 adapted to be engaged by the bell crank lever arm 82 in front of it when said arm 82 is moved rearwardly in response to downward movement of the corresponding tooth slide bar 58. The rod 119 also has fixed to it, a lever arm 122 which is inclined downwardly and forwardly and the lower end of which is operable against a pin 123 carried by a pendant arm 124 loosely fitted to the rod 85, and movable independently of said rod. A spring 125 tends to draw the arm 124 toward the front of the machine. 126 is a pull rod pivoted at 127 to the lower end of the arm 124 and having its forward end pivotally connected at 128 to a locking dog 129 pivoted at 130. The locking dog 129 extends vertically from its point of pivotal support and is provided at its upper end with a tooth 131 adapted to engage a ratchet wheel 132, rotatable with the transmission wheel 95, to prevent rotation of said wheel and the other elements in the train of gearing in which it is located after the dog 129 has been moved into engagement with said ratchet wheel 132. A rocker or latch device 133 extending longitudinally of the machine is pivotally mounted at 134 and is provided at its forward end with a shoulder 135 which engages a lug 136 at one side of the locking dog 129 to hold said dog in engagement with the ratchet wheel 132, which position it retains in an interim between the depression of the operating numeral key levers 2. A spring 137 connects the rocker 133 to a fixed part of the machine and tends to normally hold the forward end of said rocker in a lowered position and the rear arm of said rocker in an elevated position. The rear arm of said rocker extends beneath the lever arm 93 of the shifter F, and when said shifter is actuated to throw the clutch collar 91 into engagement with the gear wheel 89 on the shaft 88, just previous to operation of an integer wheel 87, the rocker 133 is moved to release the locking dog 129 and said locking dog is thrown out of engagement with the ratchet wheel 133 by reason of the spring 125 being permitted at this time to pull the arm 124 forwardly.

The mechanism for operating and controlling the shifter fork F by which the clutch collar on the integer wheel shaft is operated, is next to be described. 138 is a rocker extending longitudinally of the machine back of the shifter fork F, and pivotally supported at 139. The forward arm of this rocker overlies the lever arm 93 of the shifter fork F (see Fig. XIII), and said rocker has connected to it a spring 140 less powerful than the spring 137 attached to the forward rocker 133. At the termination of the rear arm of the rocker 138 is a cam finger 141 having upper and lower cam faces adapted to be traversed by an operating member to be presently described. 142 is a transverse rock shaft at the rear of the calculating mechanism, said shaft having fixed to it a series of arms 143 of a number equal to the number of operating bars 58 and the bell crank lever arms 81 fitted thereto. In the upper end of each arm 143 is a notch 144 in which a pin 145 carried by the corresponding bell crank lever arm 82 is operable, thereby providing for the transmission of motion from said bell crank lever arm 82 to an arm 143 and the rock shaft 142 when an integer wheel operating slide bar 58 is lowered. The arms 143 are normally held in the forward position seen in Fig. V of a retracting spring 146 attached to the rock shaft 142.

Means is provided for varying the tension of the spring 146. This means comprises a pivotally mounted arm 146ª to which the end of said spring opposite that attached to the rock shaft 142 is connected. The arm 146ª is pressed forwardly by a rockable detent arm 146ᵇ carried by a rod 146ᶜ journaled in the side wall 5 of the calculating machine frame and provided with a knob 146ᵈ at the outside of the machine. The point of the detent arm 146ᵇ is adapted to engage teeth at the rear edge of the arm 146ª to hold said arm in any position to which it may be adjusted by the detent arm, a presser arm 147 is fixed to the rock shaft 142 adjacent its end at which the rear end of the rocker 138 is located. Said presser arm extends vertically from the rock shaft and is provided at its upper end with a cam finger 148 having top and bottom working faces which are adapted to ride in contact with the top and bottom faces of the cam finger 141 on the rocker 138 during forward and backward movements of said presser arm.

At the beginning of the operation of an integer wheel 87 by one of the operating slide bars 58, the presser arm 147 is moved rearwardly under the influence of a bell crank lever arm 82 and the corresponding arm 143 which is fixed to the same shaft (142) as that to which the presser arm 147 is fixed. During the rearward movement of the presser arm 147 the cam finger 148 at its upper end rides under the cam finger 141 on the rear end of the rocker 138, with the result of raising the rear end of said rocker and depressing its forward end. The forward end of the rocker overlies the lever arm 93 of the clutch shifting fork F, whereby the clutch collar 91 splined to the integer wheel shaft 88 is engaged with the gear wheel 89, as one of the first steps in throwing the calculating mechanism into operation. Then, upon the continued downward stroke of the integer wheel operating slide bar 58, the integer wheel engaged thereby is caused to partake of the proper degree of rotation according to the integer, and it rotates the integer wheel shaft 88 a corresponding degree and the gear wheel 89 acts to operate the train of gearing leading to the registering mechanism. The shifting fork lever arm 93 in its downward movement depresses the rear arm of the rocker 133, whereby the shoulder 135 at the forward end of said rocker is moved to release the locking dog 129 to permit the operation of the train of gearing leading from the integer wheel shaft to the registering mechanism. Immediately upon the cam finger 148 on the presser arm 147 passing completely beneath the cam finger 141 on the rocker 138, said rocker is returned to its former position under the influence of the spring 137 which causes the rear arm of the rocker 133 to press upwardly against the shifting fork lever arm 93, and the shifter fork is returned to its normal position by a spring connecting it to the frame of the machine approximately simultaneously with this return of the parts described to their normal positions, the locking dog returning to its normal position to lock the ratchet wheel 132 as previously described.

Means for preventing retrograde movement of the integer wheel shaft 88 and the parts coöperable therewith, including the operating numeral key levers, is provided. This means comprises two pawls 150. These pawls are pivoted to the frame of the machine at 151 (see Fig. XIII), and they engage a ratchet wheel 152 rotatable with the ratchet wheel 132 and the spur wheel 95. A spring 153 connecting said pawls 150 holds them in engagement with said ratchet wheel 152. Both of said pawls are constantly engaged with the ratchet wheel 152 and restrain the gear wheel 95 from retrograde rotation, but only one of them is positively seated between adjacent teeth of the ratchet wheel at a time, the other being ready to move into positive engagement immediately upon the tooth of the other pawl becoming slightly disengaged. There is, therefore, no possibility of such play of the parts controlled by the pawl and ratchet device as will permit the slightest retrograde motion. Consequently, when a numeral key lever of the operating typewriting machine is partially depressed it cannot again move upwardly the least degree until its stroke has been completed.

Means is also provided to prevent the keys from being depressed after they have started upon their ascending strokes. I have already described that at the completion of the downward stroke of each integer wheel operating slide bar 58, the locking dog 129 becomes engaged with the ratchet wheel 132 to prevent movement of the elements in the train of gearing between the integer wheel shaft 88 and the registering mechanism. On the clutch collar 91 fitted to the integer wheel shaft is a ratchet 154 constantly engaged by a spring actuated pawl 155 carried by the wheel 89. The ratchet and pawl device just described does not perform any driving function, the pawl 155 merely riding idly with the wheel 89 when the clutch collar is in engagement therewith while motion is being transmitted from the integer wheel shaft to the registering mechanism. Now it will be understood that inasmuch as the locking dog 129 holds the wheels 94 and 95 from rotation and the gear wheel 89 on the integer wheel shaft is in engagement with the wheel 94, said wheel 89 must remain stationary during retrograde rotation of the integer wheel shaft 88. The ratchet wheel 154 rides idly in contact with the pawl 155, but if an attempt is made to rotate the parts in the opposite direction, as by again exerting downward pressure upon an operating numeral key lever, the pawl and ratchet device become active to prevent any such action.

Means for avoiding rebound of the integer wheel shaft 88 when it is re-rotated after operation of an integer wheel is included in my calculating mechanism. A disk 156 is fixed to the integer wheel shaft at the end journaled in the base side wall 6, said disk being cut away to provide a notch at one end of which is an abutment 157, (see Figs. II and XIII^A) adapted to rest against a pin 158 rigidly seated in the side wall 6. The disk 156 is also provided with a shoulder 159 which is disposed at the top of the disk when the integer wheel shaft is at rest. 160 is a locking dog pivoted at 161 to the side wall 6 and provided at its forward end with a tooth normally held against the shoulder 159 on the disk 156, due to pull exerted upon the dog 160 by a spring 162. When the integer wheel shaft 88 is to be operated, the dog 160 is thrown out of engagement with the disk 156 by the operation of a lever 163 pivoted at 164 to the side wall 6. The forward arm of this lever rests beneath a leg extending downwardly from the dog 160 and is held in contact therewith by a spring suitably applied. The rear arm of the lever is provided at its termination with a cam finger 165. 166 is an arm fixed to the rock shaft 142 and provided at its upper end with a cam finger 167 (see Figs. I and XIII^A). The cam finger 167 is normally positioned in front of the cam finger 165 on the lever 163 and is adapted to ride rearwardly over the last mentioned cam finger. When one of the toothed bars 58 is depressed, the rock shaft 142 has a partial rotation imparted to it in the manner already explained, and the arm 166 is moved rearwardly at the beginning of the partial rotation of said rock shaft. During the movement of said arm its cam finger 167 rides over and in contact with the cam finger 165 on the lever 163, thereby operating said lever and causing it to elevate the locking dog 160 and throw it out of engagement with the disk 156 on the integer wheel shaft. The tooth of the locking dog then rides on the periphery of said disk until the integer wheel shaft has been returned under the action of the spring 88' (see Fig. XIII^A) after its operation and the tooth of the locking dog drops back of the shoulder 159 on the disk 156 and holds said disk and the integer wheel shaft from rotation.

It is highly desirable to prevent the operation of a second integer wheel operating bar 58 when one of said bars has been lowered and until it has returned to its normal elevated position. Extending transversely of the calculating mechanism back of the bars 58 is a support 168. 169 are cam plates pivoted at 170 to said support, and extending upwardly therefrom. Said cam plates are so located as to provide for legs 171 carried by the bell crank lever arms 81 being operable against opposing cams on the plates to spread the plates apart during the downward movement of said bell crank lever arms when they are actuated by the toothed slide bars 58. The endmost cam plates 169 are joined to each other by a connecting bar 172 the ends of which are pivoted to said endmost cam plates. The connecting bar 172 is of such length that it will permit any two of the opposing pairs of cam plates to be separated by the leg of the bell crank lever arm 81 just sufficiently for said leg to descend between said plates, the remaining cam plates being so shifted relative to each other by this action as to prevent descent of the leg 171 of another bell crank lever between them. It will, therefore, be seen that it is impossible to lower a second integer wheel operating slide bar 58 owing to lack of opportunity for downward movement of more than one bell crank arm 81 at the one time.

To prevent the movement of the platen carriage of the typewriting machine while the calculating mechanism is being operated, I employ mechanism of which the following is a description: I have previously explained that the rock shaft 142 is partially rotated during each movement of the bell crank lever 82. A lever arm 173 (see Fig. XVI) fixed to this shaft has connected to it an operating rod 174 which leads rearwardly and is pivoted at 175 to a throw arm 176 rockably supported at 177. A pusher arm 178 is pivoted to the upper end of the throw arm 176 at 179, and has a rearwardly extending arm. A spring 181 tends to hold the rear end of the pusher arm 178 directed upwardly and rearwardly as seen in Fig. XVI. The pusher arm 178 is normally positioned in front of the lower end of a rocker 182 pivoted at 183 to the frame of the typewriting machine, said rocker having an upper arm extending into proximity with a latch 184 adapted to be thrown into engagement with the escapement wheel W of the typewriting machine normally withheld from said wheel by a retracting spring 185. When the rock shaft 142 is rotated in consequence of the depression of a numeral key lever of a typewriting machine to perform a calculating operation, the pusher arm 178 is carried rearwardly by the throw arm 176. Rocker 182 is actuated to move the latch 184 into engagement with the escapement wheel W, thereby holding the platen carriage of the typewriting machine from movement until the rocker 182 has returned to its normal position. A governor arm 186 serves to direct and control the operation of the pusher arm 178. This governor arm is pivoted at 187 and it extends rearwardly alongside of the pusher arm 178, being normally held in a horizontal position against a pin 188 by a spring 189. The governor arm is provided with a cam finger 190 having upper and lower working faces which are adapted to be engaged by a pin 191 carried by the pusher arm 178. When said pusher arm 178 is moved rearwardly to press against the lower end of the rocker 182 the pin 191 rides upon the upper face of the cam 190 and said cam finger serves as a support for said pusher arm until the rocker 182 has been actuated. Then, upon the return movement of the throw arm 187, the pin 191 rides beneath the cam finger 190 and the latter acts to lower the pusher arm of the pawl 178 out of the path of movement so that the return movement of the rocker 182 will not be interfered with.

I have previously described mechanism whereby full stroke movements of the numeral key levers and the integer wheel operating bars are occasioned. It is necessary to provide additional means necessitating a full stroke movement of the integer "1" key lever and bar operable thereby for the reason that the slide bar 58 which operates the integer "1" wheel 87 does not come into action until the latter portion of the downward stroke of said bar, and in the absence of any means to prevent the occurrence, it is possible for the printing bar of the typewriting machine to print without the calculating mechanism being operated. To prevent such occurrence I incorporate in my calculating mechanism means, shown in Figs. V, XIII and XX to XXIX inclusive, for engagement with the bell crank lever arm 81 associated with the integer "1" slide bar 58 whereby said bell crank lever arm and bar 58 are prevented from retrograde movement after they have been partially moved in either direction and before the stroke in either direction has been completed. The bell crank lever arm 81 just mentioned is provided at one side with a ratchet member 192, the teeth of said ratchet member being located at its front edge and being of such form that when a pawl to be presently described is in engagement therewith, the lever arm 81 will be held from upward movement. At the opposite side of said bell crank lever arm is a ratchet member 193 having teeth at its front edge adapted to receive a pawl to be described, the teeth of this last mentioned ratchet member being adapted to be engaged by the last mentioned pawl to prevent downward movement of the bell crank lever arm 81. 194 is a pawl carrying arm pivotally supported at 194ª and extending upwardly from its point of pivotal connection with the frame of the machine. The pivot of this pawl carrying arm extends at a right angle to the bell crank lever arm 81, and the arm is, therefore, so mounted as to permit forward and rearward movement. Said pawl carrying arm is loosely connected to its pivotal support to permit lateral movement of the arm, and it is normally drawn sidewise by a spring 195 connecting it to the side wall 5 of the base of the calculating machine. The pawl carrying arm 194 is provided with two pawls 196 and 198 which are adapted to, respectively, engage the ratchet members 192 and 193. Said pawls are separated from each other to permit downward movement of the bell crank lever arm 81 between them, and the pawl 196 is provided with a cam face 197 which receives the engagement of said bell crank lever arm when the latter is depressed, whereby the pawl carrying arm 194 is moved laterally and in the direction opposite to that in which it is drawn by the spring 195. When the numeral "1" integer wheel operating slide bar 58 is lowered, the bell crank lever arm 81 operable thereby is moved downwardly from the position seen in Figs. XX to XXII, and the pawl 196 rides against the teeth of the ratchet member 192 in engagement with the teeth of said member ready to prevent return movement of the bar 58 if said bar is not completely depressed. The relative positions of the parts during this time will be understood by referring to Figs. XXIII to XXV. Near the completion of the downward stroke of said bar the bell crank lever arm 81 rides against the cam 197 and throws the pawl 196 laterally in a direction opposed to that in which the pull is exerted by the spring 195 until said pawl 196 has escaped from the ratchet teeth of and become seated against the side face of the ratchet member 192 (see Fig. XXVII). The pawl 196 then offers no resistance to the upward movement of the bell crank arm 81, and said arm readily returns to its normal position. During the upward movement of said bell crank lever arm the pawl 198 rides against the teeth of the ratchet member 193, and if any attempt is made to depress the integer "1" slide bar 58 after the bell crank lever arm 81 has started to ascend, said pawl 198 will prevent downward movement of the bell crank lever arm 81 necessary for downward movement of the bar 58.

I also provide an additional safeguard to prevent the descent of the bar 58 by which the integer "1" wheel is operated. This additional safeguard comprises a pivotally mounted dog 198ª located back of the cam finger 148 carried by the presser arm 147 on the rock shaft 142 (see Figs. V, X and XI). This dog drops into position back of said cam finger when the integer "1" bar 58 has been depressed and is partially elevated and prevents rearward movement of the arm 147 necessary for the descent of said bar 58.

It desirable to at times release the shifter bar 71 from engagement with the arm 69 carried by the rock shaft 68 to prevent actuation of said rock shaft by the feeder E on the typewriter carriage and the connections leading therefrom to the shifter bar 71. This is done to permit continued use of the typewriting machine without the connectors 59 being thrown into engagement with the numeral key levers 2. As previously explained these parts, in conjunction with the parallel rods 66 supported by the rock shaft 68, serve to throw the connectors 59 into and out of engagement with the key levers 2 of the typewriting machine. When it is desired to hold said connectors out of engagement with said key levers, the shifter bar 71 is disconnected from the pin 70 on the arms 69 carried by said rock shaft 68. The connection between the shifter bar and said arm 69 is furnished by said pin 70 seating in a slot 71ª (see Fig. II) extending upwardly in the shifter bar and having a cam face at its front edge. To break this connection the shifter bar is elevated so that the pin 70 occupies the wider lower end of said slot 71ª and the shifter bar is elevated by the following mechanism, shown in Figs. I, II, XIV and XV. 199 is a vertically movable lift lever located in front of the rock shaft 68 and pivotally mounted at 200 intermediate of its ends. One arm of this lever is loosely fitted to the forward end of the shifter bar 71. The opposite arm of said lift lever extends toward the side wall 6 of the calculating machine frame, and is provided with a pin 201 engaged by the forked arm 202 of a throw lever 203 movable toward and away from said wall 6. A horizontally movable lever 204 is pivotally supported at 205 intermediate of its ends (see Fig. I). This last mentioned lever extends longitudinally of the machine and its rear arm is engaged with the upper end of the throw lever 203. The forward arm of said lever 204 is fitted to a shift collar 206 operable transversely of the calculating machine on a rod 207. The shift collar 206 is provided with an upwardly extending finger piece 208 operable in a slot 209 in a transverse plate 210, said slot having an offset at its end nearest the frame wall 6 into which the finger piece 208 is adapted to enter when moved to that end of the slot. A spring 210ª connecting the forward end of the lever 204 to the plate 210 serves to normally hold the forward end of the lever in the position in which it is seen in Fig. I. When it is desired to hold the connectors 59 out of engagement with the key levers 2, the operator moves the finger piece 208 into the offset at the end of the slot 209 and causes the finger piece and the shift collar 206 to be held in this abnormal position. In so shifting the finger piece and shift collar the lever 204 is moved with the result of operating the throw lever 203 and the lift lever 199, whereby the latter acts to elevate the shifter bar 71 out of engagement with the pin 70 carried by the arm 69 on the rock shaft 68. The shifter bar 71 is then inoperative to impart movement to said rock shaft and the parts carried thereby through the medium of which the connectors 59 are thrown into and out of engagement with the numeral key levers 2, and said connectors remain separated from said key levers so that the typewriting machine may be operated without any operation of the calculating mechanism.

Before proceeding to the description of the accumulator I will describe the lock opening mechanism which controls the operation of the accumulator and which is operable by the numeral key levers 2 of the typewriting machine. 211 is an arm fixed to the rock shaft 142 and therefore adapted to be thrown rearwardly when said rock shaft is rotated upon the depression of the numeral key lever 2. At the upper end of said arm 211 is a cam finger 212 arranged to traverse a cam finger 213 projecting laterally from the rear end of a rocker 214, which is pivoted intermediate of its ends at 215 and is subject to the action of a spring 214'. These parts are most clearly seen in Fig. II, the cam fingers 212 and 213 being shown in detail in Figs. VIII and IX. The forward arm 216 of the rocker 214 is positioned beneath rear edge of an elongated universal unlocking member in the form of a transverse bar 217 which is held in contact with said arm by a spring 218. 219 is a throw out lever pivoted at 220 to the carriage D, to which the master wheel 14 for operating the accumulator is fitted. The rear arm of the throw out lever 219 is positioned beneath the transverse bar 217 to ride to and fro with the carriage D transversely of the machine and is held presented thereto by a spring 221. It will be seen that when the rear arm of the rocker 214 is depressed though the medium of the coöperable cam fingers 212 and 213 on the arm 211 and said rocker, respectively, the forward arm 216 of said rocker will be elevated and tilt the transverse bar 217 with the result of depressing the rear arm of the throw out lever 219 and elevating the forward arm of said lever. This operation takes place irrespective of the position of the carriage D and the master wheel 14, and therefore the throw out lever 219 may be brought into action to unlock the accumulator irrespective of its location on its supporting members.

Proceeding now to a description of the accumulator C shown in Figs. XXXV to XLI. Loosely mounted on a shaft 222 in the accumulator is a series of primary transmission wheels 223 which receive the engagement of the master wheel 14. These transmission wheels are arranged in mesh with secondary transmission wheels 224 loosely mounted on a shaft 228. Each of the wheels 224 has rigidly associated with it a tooth 225 offset latterly from the main teeth of the wheel and a locking disk 226 provided with a peripheral notch 227. The main teeth of the secondary transmission wheels 224 mesh with gears 229 associated with the numeral disks 230. It will be understood that if no restraint were offered the master wheel 14 would operate a primary transmission wheel 223 when placed in engagement therewith. A secondary transmission wheel 224 would be operated by the primary wheel and a numeral disk 230 in turn operated by the secondary transmission wheel. However, the operation of these wheels is under the control of the throw out lever 219 and therefore the accumulator includes the mechanism next to be described.

Near the bottom of the accumulator C is a pivot rod 231 on which a series of rocker arms 232 is mounted to move independently of each other. The upper end of each of these arms is normally held in a rearward position by a spring 233 connecting a tail 234 of the arm to the frame of the accumulator. Each rocker arm is provided with an extending finger 235 which may be engaged by the throw out lever 219. Each rocker arm has journaled to it at its upper end a double gear comprising a wide toothed gear element 236 and a gear element 237, these elements being fixed to each other. The wide gear element 236 normally meshes with a secondary transmission gear wheel 224 opposed to it and is of sufficient width to span the locking disk 226 associated with the secondary transmission gear wheel 224 of the next lowest order. The object of this is to provide for the locking of the secondary transmission wheel 224 by the gear element 236 that is in mesh therewith at one side and rides on the face of the locking disk 226 on the other side. This renders it possible to prevent rotation of the master wheel 14 except when the notch 227 in the locking disk is brought into position to receive a tooth of the gear element 236, and this takes place at the time that the single tooth 225 on the secondary transmission wheel 224 engages the gear element 237. It will now be understood that when a secondary transmission wheel 224 has been rotated nine-tenths of a revolution and an additional tenth part of the revolution is taking place the tooth 225 will enter into engagement with gear element 237 and a tooth of the gear element 236 will pass through the notch 227 in the locking disk 226. During this time the gear element 236 is in mesh with the secondary transmission wheel 224 of the next highest order and consequently transfer is made from a secondary transmission wheel of a lower order to one of a higher order.

From the foregoing it will be appreciated that when any of the gear elements 236 extends over an adjacent locking disk 226 the master wheel 49 cannot be rotated if it is in engagement with a primary transmission wheel 223. This is due to the secondary transmission wheel 224 being locked by the gear elements 236 and it is necessary to move said gear element out of engagement with the secondary transmission wheel which is to be operated by the master wheel 14, the release of these parts being effected by throwing the arm 232 carrying the gear element 236 to be released toward the front of the accumulator and this movement of said arm 232 is occasioned by the throw out lever 219. The means for operating said throw out lever upon the depression of a numeral key lever 2 of the typewriting machine has been previously described, and it is deemed sufficient to here add that when the throw out lever is operated it acts to tilt the arm it is in engagement with into the position occupied by the arm engaged by the throw out lever in Fig. XXXVII. When the arm 232 is tilted into such position a finger 238 carried by the arm strikes against a rockable L-shaped abutment bar 239 extending transversely of the accumulator and connected to the accumulator frame by a spring 240. The finger 238 engages the vertical wing of the L-shaped abutment bar 239 and by tilting it moves the rear edge of the rearwardly extending wing of said bar downwardly into a position in front of all of the other arms 232 except the one which is being shifted by the throw out lever 219. Consequently all of the arms 232 except the one being shifted are held in a rearward position by the abutment bar 239, and the gear elements 236 are held against the locking disk 226 for transferring action.

At the front of the accumulator on the back of the gear elements 236 is a transverse centering bar 241, which is adapted to be straddled by two adjacent teeth of said gear elements 236 when the arms 232 carrying said elements are moved forwardly and out of engagement with a secondary transmission wheel 224. This centering bar serves to hold the gear elements 236 from rotation at the time mentioned and to maintain the teeth of said gear elements 236 in proper position to engage the secondary transmission gear wheels when they are returned thereto. A comb bar 242 at the top of the accumulator receives the upper ends of the arms 232 and serves to guide these arms in their forward and rearward movements.

Means for automatically locking the calculating mechanism at the decimal column of the accumulator will now be described. At the decimal point in the accumulator is an arm 243 (see Figs. XL and XLI) which is similar in shape and position to the arms 232 but which does not carry gear members as do the arms 232. The said arm 243 is mounted on the rod 231, is normally held in a rearward position by a spring 244, and is provided with a finger 245 adapted to be engaged by the throw out lever 219. The arm 243 has a tail piece 246 adapted to engage a vertically disposed rockable plate 247 (see Figs. I, II, V, XIV, XL and XLI) at the front of the calculating mechanism which extends transversely at the front of the calculating machine and the lower edge of which is pivotally supported at 248. The rockable plate 247 has pivotally connected to it a pullrod 249 (see Fig. V) which leads rearwardly from the accumulator section of the calculating mechanism to a crank arm 250 pivotally supported by a short shaft 251. Said crank arm also has connected to it a second pull rod 252, the rear end of which is connected to the lower end of a lever arm 253 pivotally supported at 254. Said lever arm 253 carries an upwardly extending stop finger 255 adapted to be engaged by the pin 84 on the integer "1" slide bar 58. When the lever arm 253 is pulled forwardly, due to the actuation of the transverse plate 247 by the arm 243, the stop finger 255 is moved rearwardly so that the pin 84 on the integer "1" slide bar 58 will strike against said stop arm and prevent the said slide bar 58 from partaking of sufficient downward movement to operate the calculating mechanism while the throw out lever 219 is opposite the decimal column of the accumulator and in engagement with the arm 243 in the decimal column of the accumulator.

In the foregoing I have only described means for preventing the operation of the calculating mechanism by the integer "1" slide bar 58 when the integer "1" key lever 2 of the typewriting machine is depressed. The slide bar 58 operated by the other numeral key levers of the typewriting machine are prevented from operating the calculating mechanism at the decimal column of the accumulator by the following mechanism: The short shaft 251 has fixed to it a presser arm 256 (see Figs. I, V, XII and XIII) which carries a pin 257 located back of the locking dog 129, adapted to engage the ratchet wheel 132 for the purpose of preventing operation of the calculating mechanism as previously described. When the rockable plate 247 is moved by the arm 243 in the accumulator the pull rod 249 is moved forwardly and the presser arm 256 is also moved toward the front of the machine, so that the pin 257 is caused to press against the locking dog 129 and move it into engagement with the ratchet wheel 132, thereby locking the calculating mechanism.

It is quite desirable to provide against the operation of the slide bars 58 when the connectors 59 are disengaged from the key levers of the typewriting machine used with a calculating mechanism, and it is also desirable to prevent the disengagement of the connectors from the key levers until such time as all of the key levers and the slide bars 58 for operating the integer wheels have been completely elevated. I therefore include in my calculating machine restraining members 258 and 258' (see Figs. V and XV) which are of service in the two particulars mentioned. The restraining members 258 are hook shaped plates, and the members 258' are flat plates, but all said restraining members are located adjacent to the path of movement of the tails 65 of the connectors 59 and have upper edges on which the lower ends of said tails may seat when the rods 66 that control the movements of the connectors are in their rear positions. When the rods 66 are in their forward positions, as seen in Figs. II and V, at which time the connectors 59 are engaged with the key levers of the typewriting machine, the tails of the connectors are permitted to move vertically without engagement with the upper edges of the restraining members 258 and 258'. Assuming the connectors to be in engagement with the typewriting machine key levers, the tails of said connectors will move downwardly between the rods 66 when the key levers are depressed, during the operation of the integer wheels, but they must return to their normal positions before the connectors can be disengaged from the key levers for the reason that the tails of the connectors must pass rearwardly above the restraining members to permit disconnection. It has been previously explained that the rods 66 are normally drawn rearwardly by spring 80 and it will therefore be apparent that the front rod 66 will prevent movement of the tails of the connectors when they are detached from the typewriting machine key levers and holds the lower ends of said tails from the upper edges of the restraining members 258 and 258', thereby preventing downward movement of the connectors 59 and the parts operable thereby until the connector shifting means including the rod 66 have been operated to place the connectors in engagement with the typewriting machine key levers ready for operation of the calculating mechanism.

I claim:

1. The combination with the traveling platen carriage and key levers of a typewriting machine, of calculating mechanism operable by said key levers and comprising an accumulator having a series of transmission wheels, a traveling master wheel shiftable step by step from one to another of said transmission wheels, and power transmission means driven by the traveling platen carriage to shift said traveling master wheel step by step, locking means whereby said power transmission means is locked when disengaged from said traveling platen carriage, and unlocking means whereby said power transmission means is unlocked to permit the master wheel to be shifted by said traveling platen carriage.

2. The combination with the traveling platen carriage and key levers of a typewriting machine, of calculating mechanism operable by said key levers and comprising an accumulator having a series of transmission wheels, a traveling master wheel shiftable step by step from one to another of said transmission wheels and power transmission means driven by the traveling platen carriage to shift said traveling master wheel step by step, and locking and unlocking means whereby said power transmission means is locked when disengaged from said traveling platen carriage and unlocked when engaged with said platen carriage.

3. The combination with the traveling platen carriage and key levers of a typewriting machine, of calculating mechanism operable by said key levers and comprising an accumulator having a series of transmission wheels, a traveling master wheel shiftable step by step from one to another of said transmission wheels, and power transmission means driven by the traveling platen carriage to shift said traveling master wheel step by step, said traveling platen carriage being provided with a traveling feeder whereby said power tansmission means is driven; locking means whereby said power transmission means is locked when disengaged from said traveling feeder, and an unlocking device carried by said traveling platen carriage and coöperable with said locking means to unlock said power transmission means immediately before the latter is driven by said traveling feeder.

4. The combination with the traveling platen carriage and key levers of a typewriting machine, of calculating mechanism operable by said key levers and comprising an accumulator having a series of transmission wheels, a traveling master wheel shiftable step by step from one to another of said transmission wheels, and power transmission means driven by the traveling platen carriage to shift said traveling master wheel step by step, said traveling platen carriage being provided with a traveling feeder whereby the power transmission means is driven and said traveling feeder being movable into and out of engagement with said power transmission means so as to shift the master wheel when the platen carriage travels in a predetermined field; locking means whereby said power transmission means is locked when disengaged from the traveling feeder, and a traveling unlocking device carried by said traveling platen carriage and coöperable with said locking means to unlock said power transmission means immediately before the latter is driven by said traveling feeder.

5. The combination with the platen carriage and key levers of a typewriting machine, of a calculating mechanism, operable by said key levers, comprising an accumulator having a series of transmission wheels, a master wheel movable from one to another of said transmission wheels, and means operable by said platen carriage for shifting and controlling said master wheel; said master wheel shifting and controlling means including a transmission shaft, spring controlled means for positively locking said shaft to prevent accidental rotation thereof when the calculating mechanism is not in service, and unlocking means on said platen carriage, by which said spring controlled locking means is actuated during the movement of said platen carriage.

6. The combination with the platen carriage and key levers of a typewriting machine, of calculating mechanism, operable by said key levers, comprising an accumulator having a series of transmission wheels, a master wheel movable from one to another of said transmission wheels, and means operable by said platen carriage for shifting said master wheel; said master wheel shifting means including a transmission shaft, means for locking said shaft, and a feeder carried by said carriage for operating said transmission shaft, said feeder being provided with a pair of cams adapted to engage said locking means, release the locking means from said transmission shaft, previous to the engagement of the feeder with the shaft, and permit the restoration of the locking means immediately following the disengagement of the feeder from the transmission shaft.

7. The combination with the platen carriage and key levers of a typewriting machine, of calculating mechanism, operable by said key levers, comprising an accumulator having a series of transmission wheels, a master wheel movable from one to another of said tranmission wheels, and means operable by said platen carriage for shifting said master wheel; said master wheel shifting means including a transmission shaft, a notched member carried by said transmission shaft, a spring controlled dog for engagement with the said notched member, and a feeder carried by said platen carriage for operating said transmission shaft, said feeder being adapted to move said locking dog out of engagement with said notched disk previous to the engagement of the feeder with the transmission shaft.

8. The combination with the platen carriage and key levers of a typewriting machine, of calculating mechanism, operable by said key levers, comprising an accumulator having a series of transmission wheels, a master wheel movable from one to another of said transmission wheels, and means operable by said platen carriage for shifting said master wheel; said master wheel shifting means including a transmission shaft, means for locking said transmission shaft, and a feeder carried by said platen carriage for releasing and operating said transmission shaft, said transmission shaft and feeder being provided with coöperable elements for preventing rotation of said shaft pending the operation of the shaft by said feeder after the release of the locking means.

9. The combination with the platen carriage and key-levers of a typewriting machine, of calculating mechanism, operable by said key levers, comprising an accumulator having a series of transmission wheels, a master wheel movable from one to another of said transmission wheels, and means operable by said platen carriage for shifting and controlling said master wheels; said master wheel shifting and controlling means including a transmission shaft, shaft locking means, and a feeder detachably mounted on said platen carriage adapted to release said shaft, operate it, and permit the restoration of the locking means before the carriage is disengaged from said shaft.

10. The combination with the traveling platen carriage and key levers of a typewriting machine, of calculating mechanism operable by said key levers and comprising an accumulator having a series of transmission wheels, a traveling master wheel shiftable step by step from one to another of said transmission wheels, and power transmission means driven by the traveling platen carriage to shift said traveling master wheel step by step, said traveling platen carriage being provided with a traveling feeder whereby the power transmission means is driven and said traveling feeder being movable into and out of engagement with said power transmission means so as to shift the master wheel when the platen carriage travels in a predetermined field; and locking and unlocking means whereby said power transmission means and master wheel are locked when the traveling feeder is disengaged from said power transmission means and unlocked when said feeder is engaged with said power transmission means, said locking and unlocking means including a locking device coöperating with said power transmission means and a traveling unlocking device carried by said traveling platen carriage, a portion of said locking device being in the path of said traveling unlocking device.

11. The combination with the platen carriage and key levers of a typewriting machine, of calculating mechanism, operable by said key levers, comprising an accumulator having a series of transmission wheels, a master wheel movable from one to another of said transmission wheels, and means operable by said platen carriage for shifting and controlling said master wheel; said master wheel shifting and controlling means including a transmission shaft, means for locking said transmission shaft, and a feeder carried by said platen carriage for releasing and operating said transmission shaft, said transmission shaft and feeder being provided with coöperable elements for preventing rotation of said shaft following its operation by said feeder and during the return of the locking means to operative position.

12. The combination with the platen carriage and key levers of a typewriting machine, of calculating mechanism, operable by said key levers, comprising an accumulator having a series of transmission wheels, a master wheel movable from one to another of said transmission wheels, and means operable by said platen carriage for shifting said master wheel; said master wheel shifting means including a transmission shaft, a notched disk carried by said shaft, a polygonal disk carried by said shaft, a spring actuated locking dog for engagement with said notched disk, and a feeder carried by said platen carriage for operating said transmission shaft, said feeder being provided with an element for holding said transmission shaft from rotation by engagement with the said polygonal disk during a partial movement of said feeder, said feeder being also provided with means for actuating said locking dog while the last mentioned elements are in engagement.

13. The combination with the platen carriage and key levers of a typewriting machine, of calculating mechanism, operable by said key levers, comprising an accumulator having a series of transmission wheels, a master wheel movable from one to another of said transmission wheels, and driving means operable by said platen carriage for shifting said master wheel, said driving means including a transmission shaft adjacent to the platen carriage of the typewriting machine; locking means, separate from said driving means, for positively locking said transmission shaft to prevent accidental rotation of said shaft when the calculating mechanism is not in service, and unlocking means carried by said platen carriage for automatically releasing said locking means from said transmission shaft.

14. The combination with the platen carriage, key levers, and tabulating elements of a typewriting machine, of calculating mechanism, operable by said key levers, comprising an accumulator, a master wheel for operating said accumulator, a transmission shaft from which motion is transmitted to shift said master wheel, and a feeder adjustably mounted on said platen carriage for operating said transmission shaft, said feeder being provided with a stop for engagement with an element of said tabulating mechanism to limit the movement of the feeder, the master wheel and the platen carriage by which the feeder is carried.

15. The combination with the platen carriage and key levers of a typewriting machine, of calcuating mechanism, operable by said key levers, comprising an accumulator having a series of transmission wheels, a master wheel movable from one to another of said transmission wheels, and means operable by said platen carriage for shifting and controlling said master wheel; said master wheel shifting and controlling means including a transmission shaft, means for locking said shaft, means carried by said carriage for releasing and operating said transmission shaft, connectors movable into and out of engagement with the typewriting machine key levers, and connector moving means operable by said transmission shaft locking means whereby said connectors are placed in engagement with said key levers.

16. The combination with the platen carriage and key levers of a typewriting machine, of calculating mechanism, operable by said key levers, comprising an accumulator having a series of transmission wheels, a master wheel movable from one to another of said transmission wheels, and means operable by said platen carriage for shifting and controlling said master wheel; said master wheel shifting and controlling means including a transmission shaft, means for locking said shaft, means carried by said carriage for releasing and operating said transmission shaft, connectors movable into and out of engagement with the typewriting machine key levers, and connector moving means operable by said transmission shaft locking means whereby said connectors are placed in engagement with said key levers and whereby the connectors are disengaged from said key levers upon the return of said locking means to active position.

17. The combination with the platen carriage and key levers of a typewriting machine, of calculating mechanism, comprising integer wheels, slide bars for operating said integer wheels, connectors pivoted to the upper ends of said slide bars and provided at their upper ends with hooks movable into and out of interlocking engagement with said key levers, and mechanism including a rockable frame operable by said platen carriage by which said connectors are moved simultaneously into and out of engagement with said key levers, said rockable frame having a pair of parallel rods providing an elongated slot in which the lower ends of said connectors are mounted.

18. The combination with the platen carriage and key levers of a typewriting machine, of calculating mechanism comprising integer wheels, slide bars for operating said integer wheels, connectors, pivoted to said slide bars, movable into and out of engagement with said key levers, and mechanism operable by said platen carriage by which all of said connectors are moved simultaneously into and out of engagement with said key levers, said mechanism comprising a rockable device having parallel rods between which the lower ends of said connectors are positioned, and a shift bar interlocked with said rockable device.

19. The combination with the platen carriage and key levers of a typewriting machine, of calculating mechanism comprising integer wheels, members for operating said integer wheels, connectors carried by said integer wheel operating members movable into, and out of engagement with said key levers, mechanism operable by said platen carriage by which said connectors are moved into and out of engagement with said key levers, said mechanism comprising a rockable device engaged by said connectors and a shift bar for operating said rockable device, and means for shifting one of said last mentioned parts out of coöperative relation with the other part to permit operation of said shift bar without operation of said rockable device to move said connectors into engagement with said key levers.

20. The combination with the platen carriage and key levers of a typewriting machine, of calculating mechanism operable by said key levers, and mechanism also operable by said key levers for locking the escapement of said platen carriage previous to the operation of said calculating mechanism by operation of said key levers, said escapement locking mechanism including a detent for engagement with the escapement, a detent operating member, a key lever actuated member, and means interposed between said key lever actuated member and said detent operating member movable into and out of the path of the other member.

21. The combination with the platen carriage and key levers of a typewriting machine, of calculating mechanism operable by said key levers, and mechanism also operable by said key levers for locking the escapement of said platen carriage previous to the operation of said calculating mechanism by said key levers, said escapement locking mechanism including a detent for locking mechanism including a detent for engagement with the escapement, a detent operating member, a key lever actuated member, and a member carried by said key lever actuated member movable into and out of the path of movement of said detent operating member.

22. The combination with the platen carriage and key levers of a typewriting machine, of calculating mechanism operable by said key levers, and mechanism also operable by said key levers for locking the escapement of said platen carriage previous to the operation of said calculating mechanism by said key levers, said escapement locking mechanism including a detent for engagement with the escapement, a detent operating member, a key lever actuated member, a spring controlled pusher arm on said key lever actuated member adapted to engage said detent operating member, and means for moving said pusher arm to locate it out of the path of return movement of said detent operating member.

23. The combination with the platen carriage and key levers of a typewriting machine, of calculating mechanism operable by said key levers, and mechanism also operable by said key levers for locking the escapement of said platen carriage previous to the operation of said calculating mechanism by said key levers, said escapement locking mechanism including a detent for engagement with the escapement, a detent operating member, a key lever actuated member, a spring controlled pusher arm pivoted to said key lever actuated member adapted to engage said detent operating member, and a governor adapted to adjust said pusher arm out of the path of return movement of said detent operating member.

24. The combination with the platen carriage and key levers of a typewriting machine, of calculating mechanism operable by said key levers, and mechanism also operable by said key levers for locking the escapement of said platen carriage previous to the operation of said calculating mechanism by said key levers, said escapement locking mechanism including a detent for engagement with the escapement, a detent operating member, a key lever actuated member, a spring controlled pusher arm pivoted to said key lever actuated member adapted to engage said detent operating member, and a spring controlled governor adapted to adjust said pusher arm out of the path of return movement of said detent operating member.

25. The combination with the platen carriage and key levers of a typewriting machine, of calculating mechanism operable by said key levers, and mechanism also operable by said key levers for locking the escapement of said platen carriage previous to the operation of said calculating mechanism by said key levers, said escapement locking mechanism including a detent for engagement with the escapement, a detent operating member, a key lever operated member, a spring controlled pusher arm pivoted to said key lever actuated member adapted to operate said detent operating member, and a spring controlled governor arm, said governor arm and pusher arm having coöperable cams whereby the pusher arm is adjusted to position out of the path of return movement of said detent operating member.

26. In a calculating machine, an integer wheel shaft, integer wheels fixed to said shaft, means for operating said integer wheels, registering mechanism operable by said integer wheel shaft, a single clutch on said integer wheel shaft adapted to transmit motion from said integer wheels to said registering mechanism, said single clutch comprising a driven clutch member loosely mounted on said integer wheel shaft and a drive clutch member secured to said integer wheel shaft to transmit motion to said driven clutch member, and means whereby said clutch is automatically thrown into action at the commencement of operation of said integer wheels.

27. In a calculating machine, the combination of integer wheel shaft, integer wheels fixed to said shaft, means for operating said integer wheels, registering mechanism, transmission gear mechanism between said integer wheel shaft and registering mechanism, a locking dog for engagement with one of the elements of said transmission gear mechanism, a latch device whereby said locking dog is retained in its active position, and means operable by the means for operating said integer wheels whereby said latch device and locking dog are moved out of active position at the commencement of operation of the integer wheels and into active position at the completion of operation of the integer wheels.

28. In a calculating machine, the combination of integer wheel shaft, integer wheels fixed to said shaft, means for operating said integer wheels, registering mechanism, transmission gear mechanism between said integer wheel shaft and registering mechanism, a locking dog for engagement with one of the elements of said transmission gear mechanism, and means operable by the means for operating said integer wheels for moving said locking dog out of active position at the commencement of operation of the integer wheels and into active position at the completion of operation of the integer wheels, said last named means including adjustable operating members for regulating the positioning of said locking dog relative to the element it serves to lock.

29. In a calculating machine, the combination of an integer wheel shaft, integer wheels fixed to said shaft, means for operating said integer wheels, registering mechanism, transmission gear mechanism between said integer wheel shaft and registering mechanism, a locking dog for engagement with one of the elements of said transmission gear mechanism, and means operable by the means for operating said integer wheels for moving said locking dog out of active position at the commencement of operation of the integer wheels and into active position at the completion of operation of the integer wheels, said last named means including adjustment screws for regulating the positioning of said locking dog relative to the element it is adapted to lock.

30. In a calculating machine, the combination of an integer wheel shaft, integer wheels fixed to said shaft, registering mechanism, transmission gearing between said integer wheel shaft and registering mechanism, a locking member adapted to engage means coöperable with said integer wheel shaft for moving said locking member into and out of active position, and a latch device also coöperable with said integer wheel shaft for restraining said locking member in active position in the interim between operations of said integer wheel shaft.

31. In a calculating machine, the combination of an integer wheel shaft, integer wheels fixed to said shaft, a clutch on said integer wheel shaft, registering mechanism, transmission gearing leading from said clutch to said registering mechanism, a locking member coöperable with said integer wheel shaft for controlling said transmission gearing, and a latch operable with said clutch for holding said locking member in active position pending movement of said clutch between operations of said integer wheel shaft.

32. In a calculating machine, the combination of integer wheel mechanism, including a series of oscillatory integer wheels and an integer wheel shaft to which said wheels are fixed, registering mechanism, and transmission gearing between said integer wheel shaft and registering mechanism, said transmission mechanism comprising a shiftable clutch device including a pair of clutch members, one of which is movable into and out of engagement with the other to control the transmission of movement to the registering mechanism, normally ineffective ratchet and pawl members constantly connecting said clutch members, and locking means coöperating with said clutch device and ratchet and pawl members to prevent reverse operation of the oscillatory integer wheels after only partial operation thereof.

33. In a calculating machine, the combination of an integer wheel shaft, integer wheels on said shaft, a driving wheel and clutch on said shaft adapted to be placed in driving engagement, registering mechanism, transmission gearing between said integer wheel shaft and said registering mechanism operable by said wheel on said integer wheel shaft, a shifter by which said clutch and driving wheel are placed in engagement, a series of slidable integer wheel operating members, bell crank levers operable by said integer wheel operating members, and means operable by said bell crank levers for actuating said shifter.

34. In a calculating machine, the combination of an integer wheel shaft, integer wheels on said shaft, a driving wheel and clutch on said shaft adapted to be placed in driving engagement, registering mechanism, transmission gearing between said integer wheel shaft and said registering mechanism operable by said wheel on said integer wheel shaft, a shifter by which said clutch and driving wheel are placed in engagement, a series of slidable integer wheel operating members, bell crank levers operable by said integer wheel operating members, and a rocker operable by said bell crank levers for operating said shifter.

35. In a calculating machine, the combination of an integer wheel shaft, integer wheels on said shaft, a driving wheel and clutch on said shaft adapted to be placed in driving engagement, registering mechanism, transmission gearing between said integer wheel shaft and said registering mechanism operable by said wheel on said integer wheel shaft, a shifter by which said clutch and driving wheel are placed in engagement, a series of slidable integer wheel operating members, bell crank levers operable by said integer wheel operating members, a rock shaft operable by said bell crank levers, a rocker engaging said shifter, and means carried by said rock shaft for actuating said rocker.

36. In a calculating machine, the combination of an integer wheel shaft, integer wheels on said shaft, a driving wheel and clutch on said shaft adapted to be placed in driving engagement, registering mechanism, transmission gearing between said integer wheel shaft and said registering mechanism operable by said wheel on said integer wheel shaft, a shifter by which said clutch and driving wheel are placed in engagement, a series of slidable integer wheel operating members, bell crank levers operable by said integer wheel operating members, a locking dog for engagement with an element of said transmission gearing, a rock shaft operable by said bell crank levers, a cam carrying arm on said rock shaft, and a rocker operable by said cam carrying arm, said rocker being adapted to operate said shifter.

37. In a calculating machine, the combination of registering mechanism, an integer wheel shaft, integer wheels fixed to said shaft, transmission mechanism operable by said integer wheels and shaft for operating said registering mechanism, key actuated slide bars for operating said integer wheels, a series of bell cranks operable directly by said slide bars, a locking member for engagement with an element of said transmission mechanism, and means operable by said bell crank levers for moving said locking member into and out of active position.

38. In a calculating machine, the combination of registering mechanism, an integer wheel shaft, integer wheels fixed to said shaft, transmission mechanism operable by said integer wheels and shaft for operating said registering mechanism, integer wheel operating members, a series of bell cranks operable directly by said integer wheel operating members, a locking member for engagement with an element of said transmission mechanism, means for operating said locking member operable by said bell crank levers, and a latch under the control of said bell crank levers for holding said locking member in active position pending the operation of said integer wheels.

39. In a calculating machine, the combination of an oscillatory integer wheel shaft, mechanism for operating said shaft, and means cooperable with said shaft operating mechanism for preventing rebound of said integer wheel shaft when it returns to normal position, said rebound preventing means comprising a disk secured to said shaft, a locking dog for engagement with said disk, a rock shaft operable by said integer wheel mechanism, and a lever actuated by said rock shaft for controlling the operation of said locking dog.

40. In a calculating machine, a combination of an integer wheel, an integer wheel operating member, a lever arm for operating said integer wheel operating member, and means for controlling the movement of said lever arm until the integer wheel operating member has completely operated an integer wheel, said controlling means comprising a pair of ratchet members carried by and arranged at opposite sides of said lever arm, and oppositely disposed pawls straddling said lever and arranged for engagement with the said ratchet members at different times.

41. In a calculating machine, a combination of an integer wheel, an integer wheel operating member, a lever arm for operating said integer wheel operating member, and means for controlling the movement of said lever arm until the integer wheel operating member has completely operated an integer wheel, said controlling means comprising a pair of ratchet members carried by and arranged at opposite sides of said lever arm, and a pair of pawls straddling said lever arm and arranged for engagement with said ratchet members, one of said pawls being adapted to prevent the movement of said lever arm in one direction, and the other pawl being adapted to prevent movement of the lever arm in the opposite direction.

42. In a calculating machine, a combination of an integer wheel, an integer wheel operating member, a lever arm for operating said integer wheel operating member, and means for controlling the movement of said lever arm until the integer wheel operating member has completely operated an integer wheel, said controlling means comprising a pair of ratchet members carried by and arranged at opposite sides of said lever arm, a pivotally mounted pawl carrier having a pair of pawls straddling said lever arm and adapted to engage said ratchet members, said pawl carrier being movable laterally relative to the axis of its pivot to provide for the disengagement of one of said pawls from the ratchet member engaged thereby when said lever arm has completed a movement in one direction.

43. In a calculating machine, a combination of an integer wheel, an integer wheel operating member, a lever arm for operating said integer wheel operating member, and means for controlling the movement of said lever arm until the integer wheel operating member has completely operated an integer wheel, said controlling means comprising ratchet members carried by and arranged at opposite sides of said lever arm, a pivotally mounted pawl carrier having a pair of pawls straddling said lever arm and arranged for engagement with said ratchet members, said pawl carrier being movable laterally relative to the axis of its pivot and being provided with a cam adapted to be engaged by said lever arm to throw the pawl carrier laterally and disengage one of the pawls from a ratchet member engaged thereby at the completion of a movement of said lever arm in one direction.

44. In a calculating machine, an accumulator having locking means, including individual locking elements for restraining its mechanism from operation, a traveling master wheel shiftable into operative engagement with said accumulator, differential mechanism whereby said master wheel is rotated, and an unlocking device whereby said individual locking members are unlocked to permit operation of selected accumulator wheels, said unlocking means including a traveling unlocking member moving with said master wheel to select the individual locking element and a second unlocking member cooperable with the traveling unlocking member to unlock the selected individual locking element, said second unlocking member being under the control of the differential mechanism whereby the master wheel is rotated.

45. In a calculating machine, an accumulator having locking means including individual locking elements for restraining its mechanism from operation, a traveling master wheel shiftable into operative engagement with said accumulator, differential mechanism whereby said master wheel is rotated, and an unlocking device whereby said individual locking members are unlocked to permit operation of selected accumulator wheels, said unlocking means including a traveling unlocking member moving with said master wheel to select the individual locking element and an elongated universal unlocking device cooperable with said traveling unlocking member to unlock any one of the several individual locking elements, said universal unlocking device being under the control of the differential mechanism whereby the master wheel is rotated.

46. In a calculating machine, an accumulator having an element therein by which the accumulator mechanism is restrained from operation, a master wheel movable into and out of engagement with the accumulator mechanism, counting mechanism for operating said master wheel, a throw-out lever movable with said master wheel adapted to actuate the restraining element of the accumulator, and a bar traversed by said throw-out lever coöperable with said counting mechanism whereby said lever is operated when said master wheel has been shifted to said accumulator.

47. In a calculating machine, an accumulator having means therein for restraining the accumulating mechanism from operation, a master wheel movable transversely relative to said accumulator adapted to be brought into engagement with the accumulator mechanism, counting mechanism for operating said master wheel, a throw out lever movable with said master wheel to a position to engage the means for restraining the accumulating mechanism from operation, a member extending transversely of the accumulator for operating said throw out lever irrespective of the position of said master wheel, and means coöperable with said counting mechanism for actuating the member by which said throw out lever is actuated.

48. In a calculating machine, an accumulator having a decimal column, operating means whereby movement is transmitted to said accumulator, means for locking said operating means to prevent effective operation thereof, and lock operating means in said accumulator whereby the locking means is brought into action at the decimal column of the accumulator, said lock operating means also including a rockable member adjacent to said accumulator driven by said means in the accumulator and means for transmitting movement from said rockable member to said means for locking the accumulator operating means.

49. In a calculating machine, an accumulator having a decimal column, a traveling master wheel movable along the accumulator to transmit movement thereto, operating means whereby said master wheel is turned to actuate the accumulator, a lock for said operating means adapted to prevent effective operation thereof, a lock operating member in said accumulator at the decimal column, a traveling lock operating member movable with said master wheel, and means whereby movement is transmitted from said operating means, through said lock operating members and thence to said lock, so as to lock said operating means when the master wheel registers with the decimal column.

50. In a calculating machine, the combination of an integer wheel, an integer wheel operating member, an accumulator, a restraining member adapted to prevent effective operation of said integer wheel operating member, means adjacent to said accumulator for operating said restraining member, and means associated with the accumulator at the decimal column for operating said restraining member, operating means, said means in the accumulator being actuated by the integer wheel operating member.

51. The combination with the platen carriage and key levers of a typewriting machine, of calculating mechanism, comprising integer wheels, members for operating said integer wheels, connectors carried by said integer wheel operating members movable into and out of engagement with said key levers, mechanism operable by said platen carriage by which said connectors are moved into and out of engagement with said key levers, and a positive stop device for preventing the operation of said integer wheel operating members until said connectors have been placed in engagement with said key levers.

52. The combination with the platen carriage and key levers of a typewriting machine, of calculating mechanism, comprising integer wheels, members for operating said integer wheels, connectors carried by said integer wheel operating members movable into and out of engagement with said key levers, mechanism operable by said platen carriage by which said connectors are moved into and out of engagement with said key levers, and means independent of said last mentioned mechanism whereby said connectors are restrained from disconnection with said key levers prior to the return of the integer wheel operating members to their normal position after integer wheels have been operated thereby, the last mentioned means including a connector stop located adjacent to the paths of the connectors.

53. The combination with the platen carriage and key levers of a typewriting machine, of calculating mechanism comprising integer wheels, integer wheel operating members, key levers, connectors carried by said integer wheel operating members, means operable by said platen carriage for moving said connectors into and out of engagement with said key levers, and means independent of said carriage operated means for preventing disconnection of said connectors from said key levers during the period of operation of the integer wheels and until after the integer wheel operating members have returned to their normal positions, the last mentioned means including a relatively stationary device located adjacent to said connectors to prevent them from being disengaged from the key levers during the operation of the integer wheels but not when the keys occupy their elevated positions.

In testimony that I claim the foregoing I hereunto affix my signature.

FERDINAND J. TILLMAN.